Nov. 5, 1957 E. H. PLACKE ET AL 2,811,918
SLIP FEELER CONTROL IN ACCOUNTING MACHINES
Filed March 11, 1954 12 Sheets-Sheet 1

INVENTORS
EVERETT H. PLACKE &
WILLIS E. EICKMAN
BY
THEIR ATTORNEYS

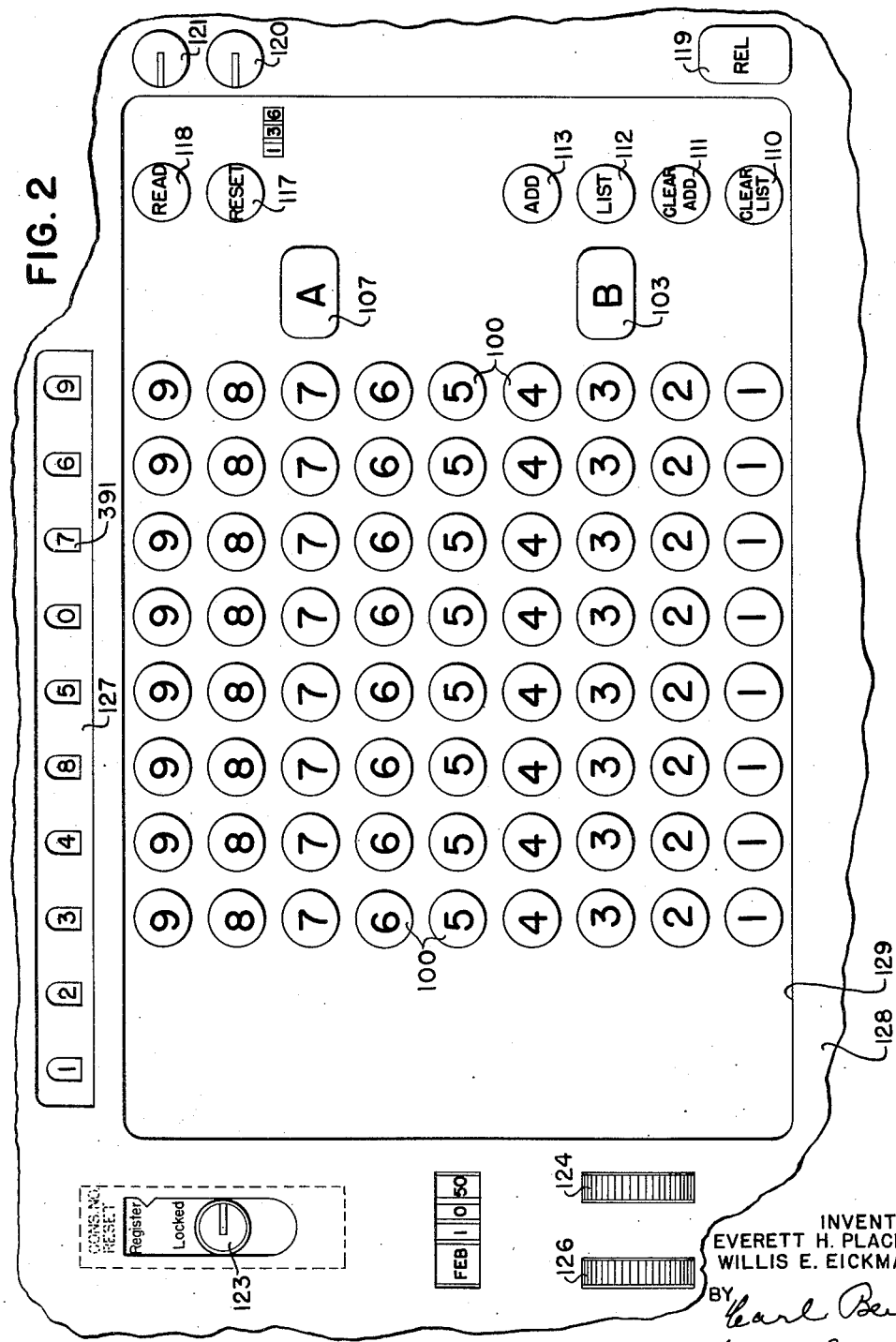

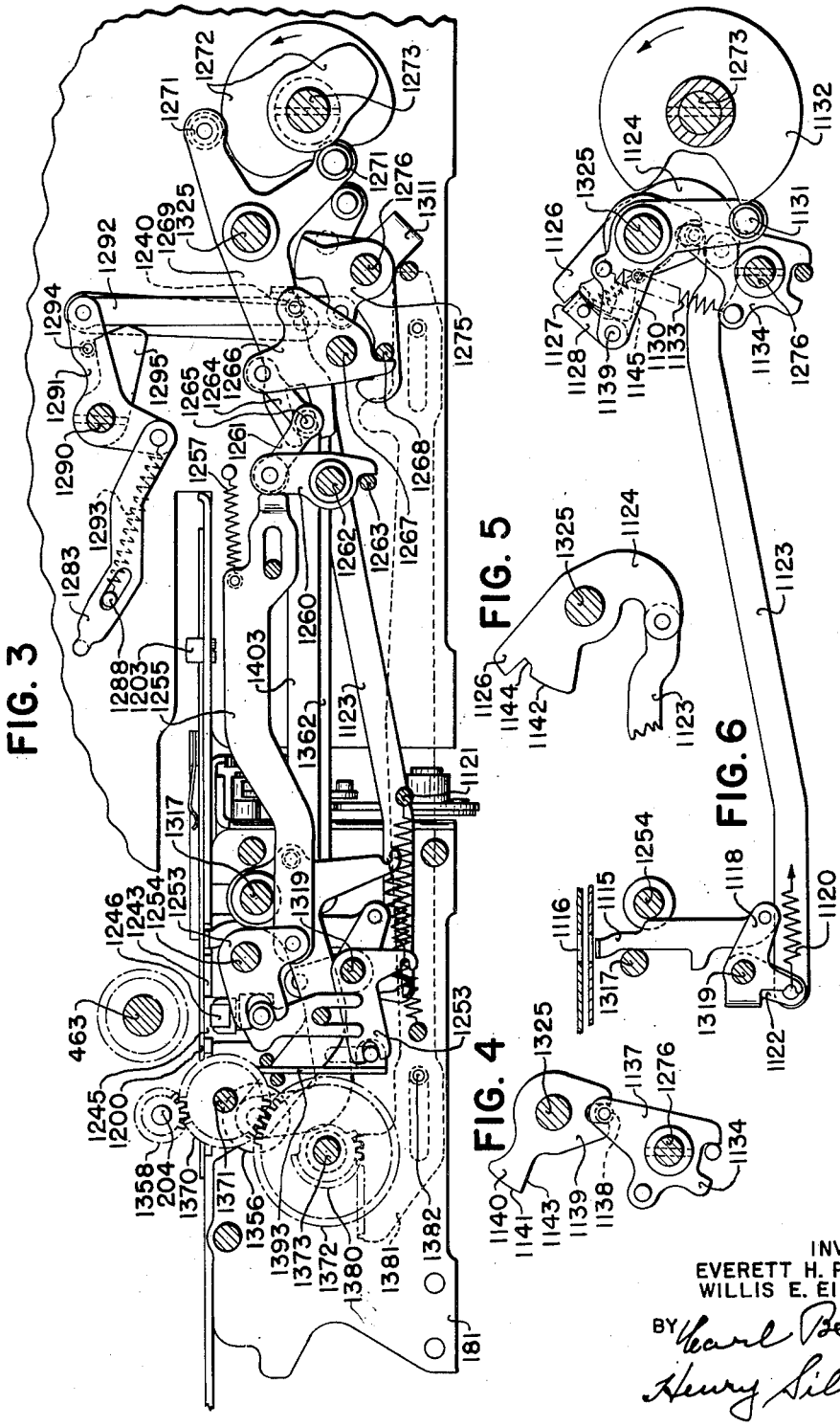

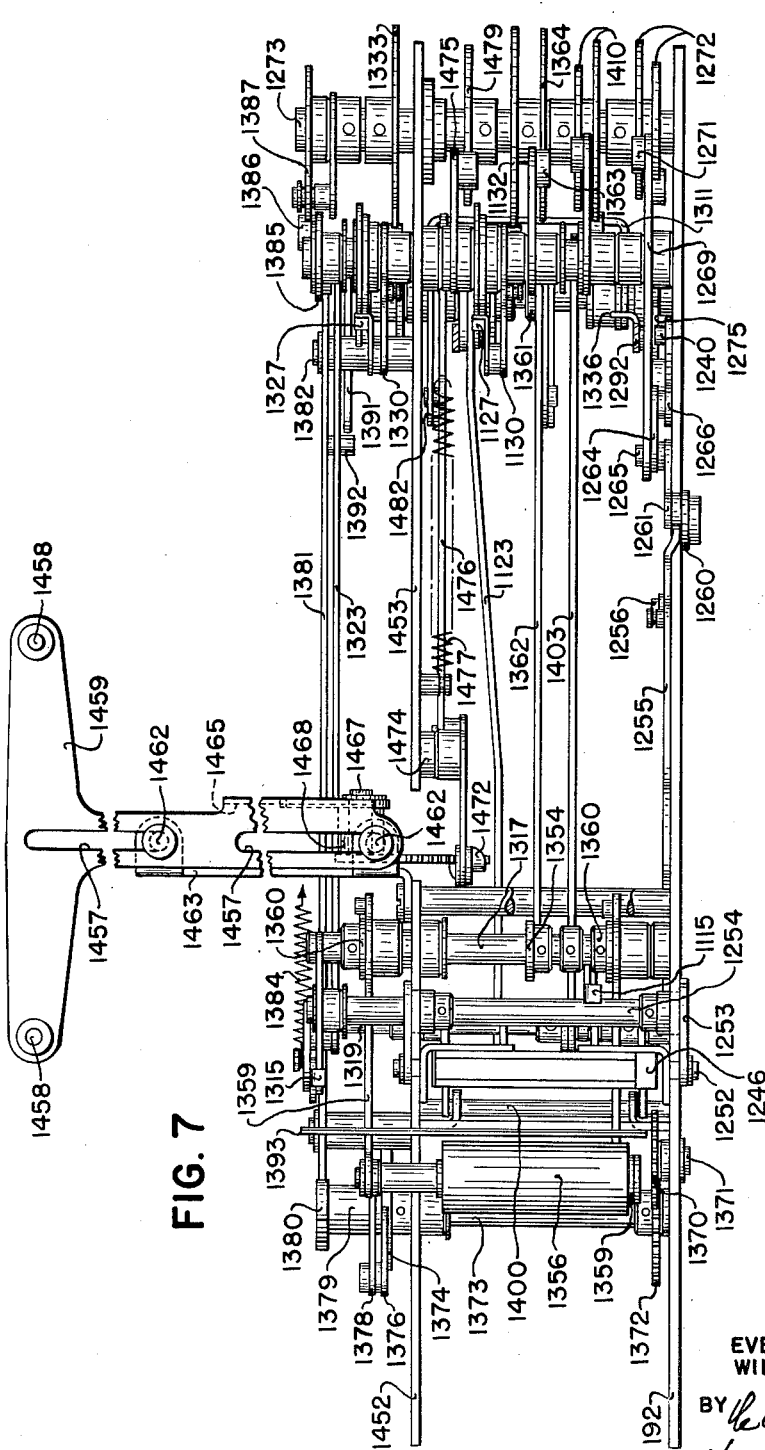

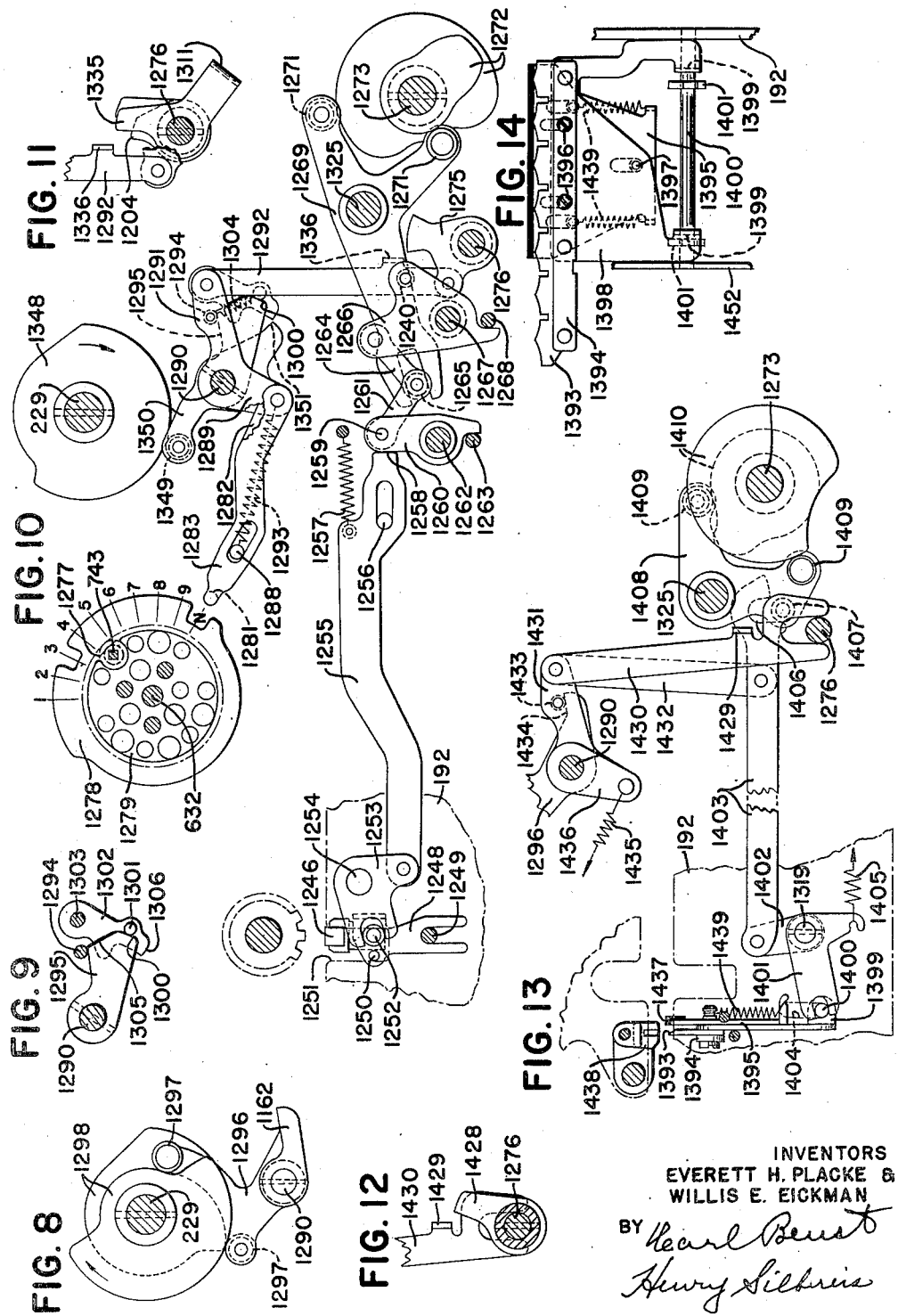

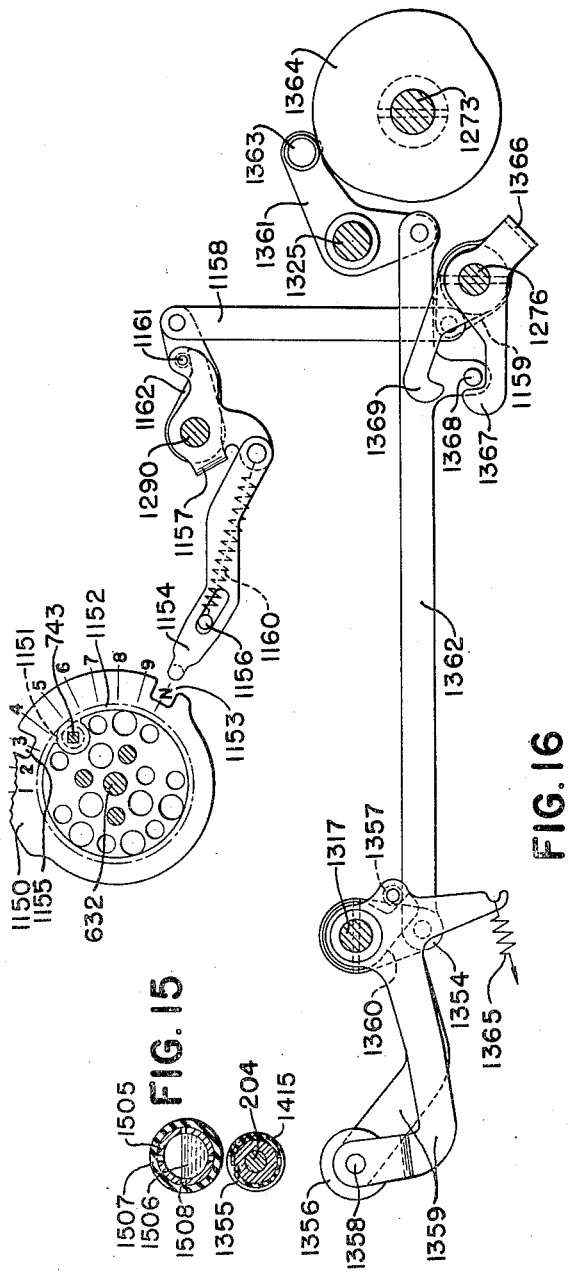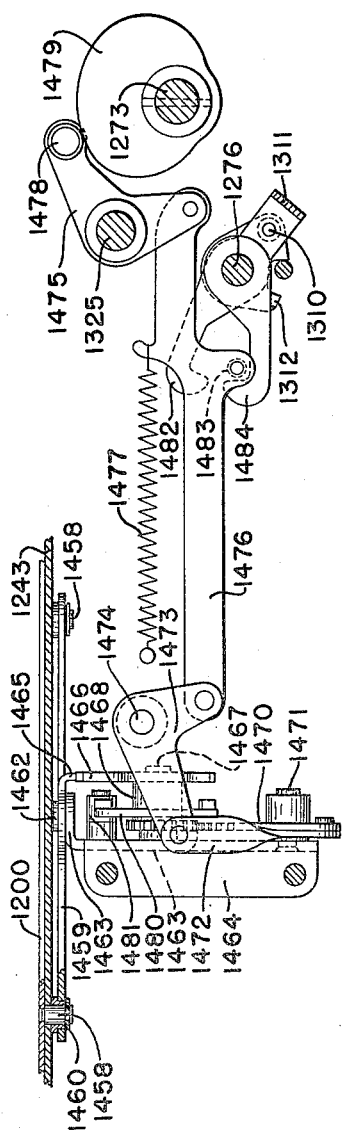

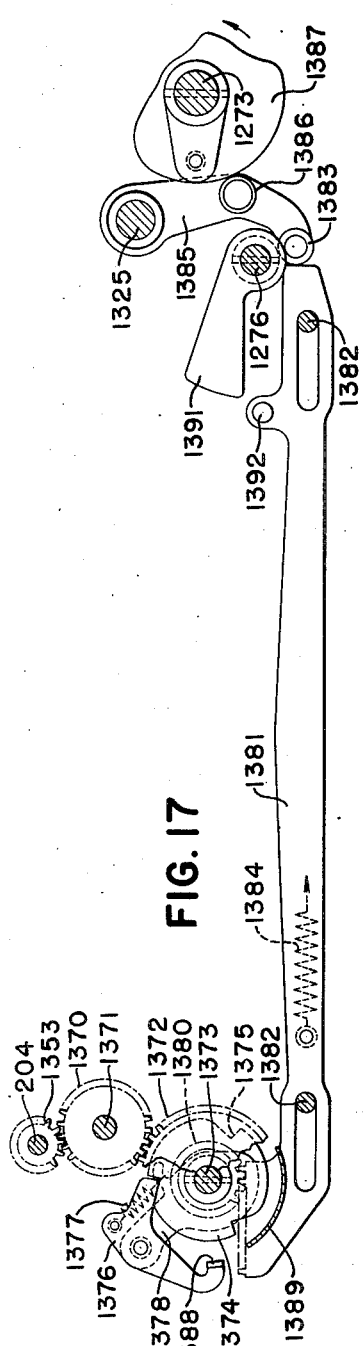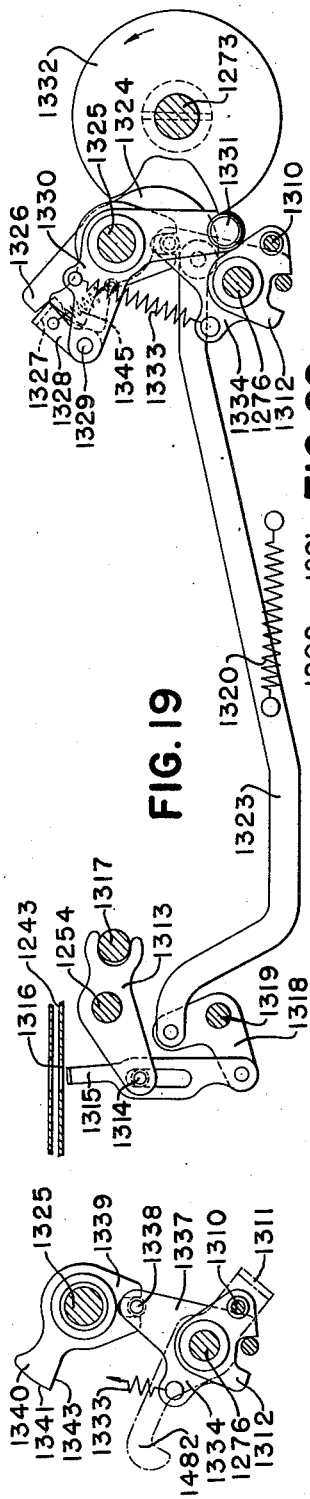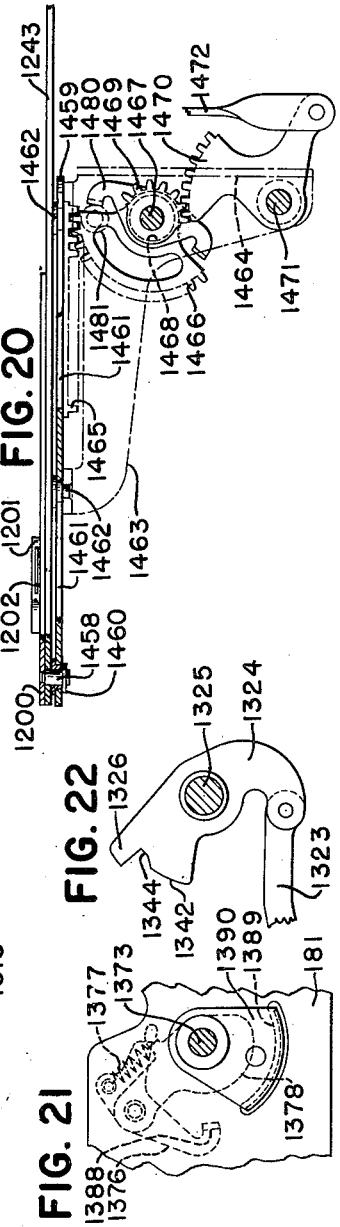

INVENTORS
EVERETT H. PLACKE &
WILLIS E. EICKMAN
BY
THEIR ATTORNEYS

Nov. 5, 1957  E. H. PLACKE ET AL  2,811,918
SLIP FEELER CONTROL IN ACCOUNTING MACHINES
Filed March 11, 1954  12 Sheets-Sheet 9
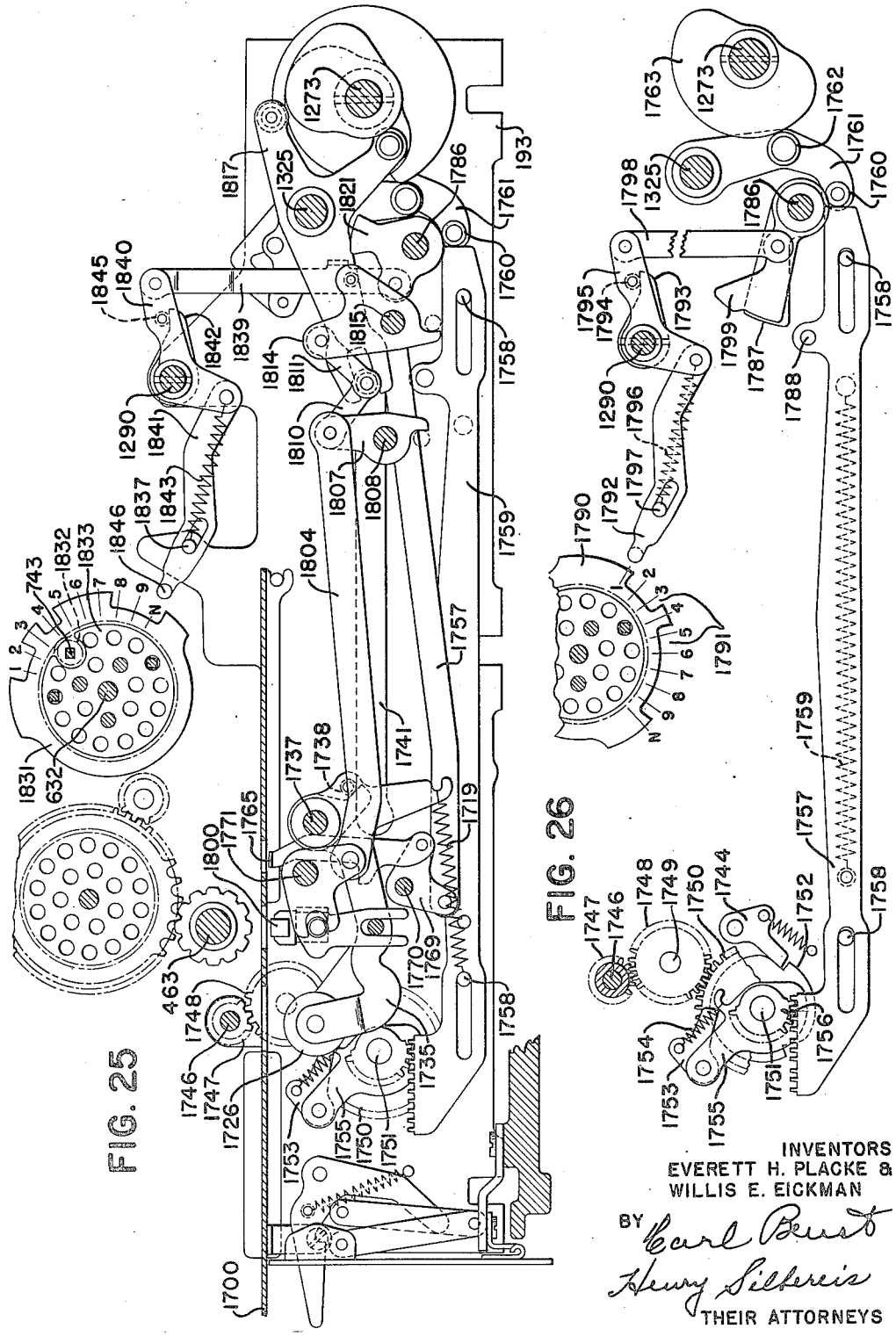
INVENTORS
EVERETT H. PLACKE &
WILLIS E. EICKMAN
BY
THEIR ATTORNEYS

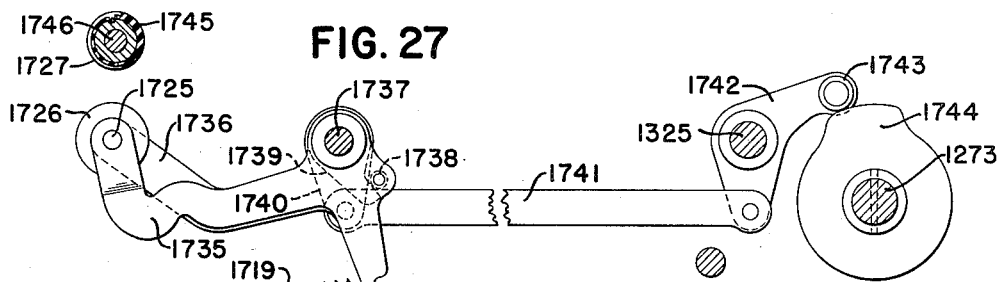
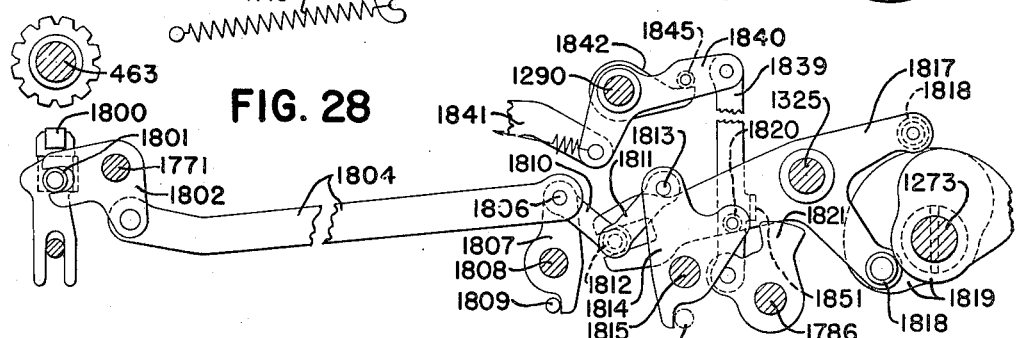
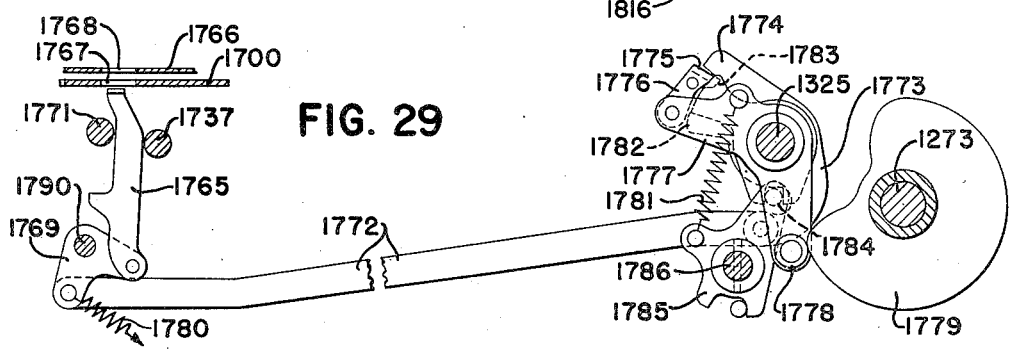
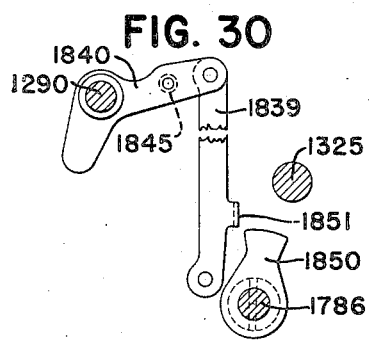

INVENTORS
EVERETT H. PLACKE &
WILLIS E. EICKMAN

THEIR ATTORNEYS

Nov. 5, 1957  E. H. PLACKE ET AL  2,811,918
SLIP FEELER CONTROL IN ACCOUNTING MACHINES
Filed March 11, 1954  12 Sheets-Sheet 12

FIG. 32

DEC 17 85 576 A   24.00

PAY TO THE ORDER OF
FIRST NATIONAL BANK
ANYTOWN, U. S. A.
NATIONAL STORES CO.
J. J. SMITH, TREASURER

FIG. 34

NATIONAL STORES CO.
333 NATIONAL AVENUE
ANYTOWN, U. S. A.
TELEPHONE

SOLD TO   JOHN DOE   INSERT AMOUNT OF REMITTANCE $ 24⁰⁰⁄₁₀₀

DEC 17-00 A 85 576 ★★★★ 24.00

DETACH AND RETURN THIS STUB WITH YOUR CHECK
YOUR CANCELLED CHECK IS YOUR RECEIPT
THIS STATEMENT COVERS TRANSACTIONS FOR 30 DAY
PERIOD ENDING ON BILLING DATE SHOWN AT LEFT.

| BILLING DATE | PREVIOUS BALANCE | CHARGE | PAYMENT | RETURN | BALANCE |
|---|---|---|---|---|---|
| DEC. 5 | | 14.00 10.00 | DEC 17-00 A 85 576 ★★★★ 24.00 PAID   24.00 NATIONAL STORES CO. ANYTOWN, U.S.A. THANK YOU WE APPRECIATE YOUR PATRONAGE | | |

DEC 17 85 575 A   35.00

PAY TO THE ORDER OF
FIRST NATIONAL BANK
ANYTOWN, U. S. A.
NATIONAL STORES CO.
J. J. SMITH, TREASURER

NATIONAL STORES CO.
333 NATIONAL AVENUE
ANYTOWN, U. S. A.
TELEPHONE

SOLD TO   JOHN DOE   INSERT AMOUNT OF REMITTANCE $ 35⁰⁰⁄₁₀₀

DEC 17-00 A 85 575 ★★★★ 35.00

DETACH AND RETURN THIS STUB WITH YOUR CHECK
YOUR CANCELLED CHECK IS YOUR RECEIPT

INVENTORS
EVERETT H. PLACKE &
WILLIS E. EICKMAN
BY *Carl Beust*
*Henry Silberis*
THEIR ATTORNEYS

United States Patent Office 2,811,918
Patented Nov. 5, 1957

2,811,918

SLIP FEELER CONTROL IN ACCOUNTING MACHINES

Everett H. Placke and Willis E. Eickman, Dayton, Ohio, assignors to The National Cash Register Company, Dayton, Ohio, a corporation of Maryland Application March 11, 1954, Serial No. 415,542

31 Claims. (Cl. 101—93)

This invention relates to improvements in record material sensing means for controlling the printing and feeding mechanisms of calculating machines and the like.

The invention is shown applied to a machine of the type illustrated in United States Patent No. 2,616,623, issued to Mayo A. Goodbar et al. on November 4, 1952.

The principal object of the invention is to provide means for controlling the recording of data on record material forms of different sizes, which means is controlled by two feeling means, whereby the recording, feeding, and issuing mechanisms are controlled in accordance with the size of record material inserted into the machine.

A specific object of the invention is to provide printing and record-receiving tables for accommodating records of two sizes; a feeler for sensing the presence of either size of record material on a table to set up certain controls; and a second feeler for sensing the presense of record material of the larger size to modify the controls set up by the first feeler.

Another object of the invention is to provide a movable table for shuttling a record material form from a position out of recording position into recording position and back again, said shuttling mechanism being controlled by two sensing means.

With these and incidental objects in view, the invention includes certain novel features of construction and combinations of parts, a preferred form or embodiment of which is hereinafter described with reference to the drawings which accompany and form a part of this specification.

Of said drawings:

Fig. 2 is a diagrammatic view of a keyboard arrangement.

Fig. 3 is a cross-sectional side elevation of the statement-printing mechanism.

Fig. 4 is a detail view of a part of the statement feeding mechanism controlled by the right-hand statement feeler.

Fig. 5 is a detail view of a part of the right-hand statement feeler driving mechanism.

Fig. 6 is a detail view showing the right-hand statement feeler, together with the mechanism controlled thereby.

Fig. 7 is a top plan view of the statement printing mechanism.

Fig. 8 is a detail view of the driving mechanism for the statement printing control mechanism, which mechanism is under control of notched disks.

Fig. 9 is a detail view of a part of the mechanism shown in Fig. 10.

Fig. 10 is a detail view of the statement printing mechanism, together with the control plate for controlling the operation thereof.

Fig. 11 is a detail view of a part of the mechanism shown in Fig. 10.

Fig. 12 is a detail view of the controls over the statement printing mechanism by the statement feelers.

Fig. 13 is a detail view showing certain controls over the perforator mechanism.

Fig. 14 is a front elevation view of the perforating knife and certain parts of the perforating mechanism.

Fig. 15 is a detail view of the statement feeding mechanism, together with the control plate for controlling its operation.

Fig. 16 is a detail view of the statement supporting table for driving its shuttling mechanism.

Fig. 17 is a detail view of the statement feeding mechanism.

Fig. 18 is a detail view of a part of the mechanism positioned by the left-hand statement feeler.

Fig. 19 is a detail view of the left-hand statement feeler, together with the mechanism controlled thereby.

Fig. 20 is a front elevation of a part of the statement stub shuttling mechanism.

Fig. 21 is a detail view of the mechanism for maintaining the statement feed pawl in feeding position during the feeding operation.

Fig. 22 is a detail view of a part of the mechanism for controlling the operation of the left-hand statement feeler.

Fig. 25 is a side elevation of the check endorsing mechanism.

Fig. 26 is a detail view of the check feeding mechanism, together with the control plate for controlling its operation.

Fig. 27 is a detail view of the feeding mechanism for the check.

Fig. 28 is a detail view of the printing mechanism for printing data on an inserted check.

Fig. 29 is a detail view of the check feeding mechanism and the mechanism controlled thereby.

Fig. 30 is a detail view of a control element positioned by the check slip feeler to prevent printing operations from being made.

Fig. 32 is a facsimile of a reverse side of a check showing the data and endorsements printed thereon.

Fig. 33 is another facsimile of a check having data and endorsements printed thereon.

Fig. 34 is a facsimile of a complete statement showing the printing on the stub and the main portion of the statement.

Fig. 35 is a facsimile of a stub showing the printing thereon, when the stub only is positioned on the printing table.

GENERAL DESCRIPTION

Figure 1:
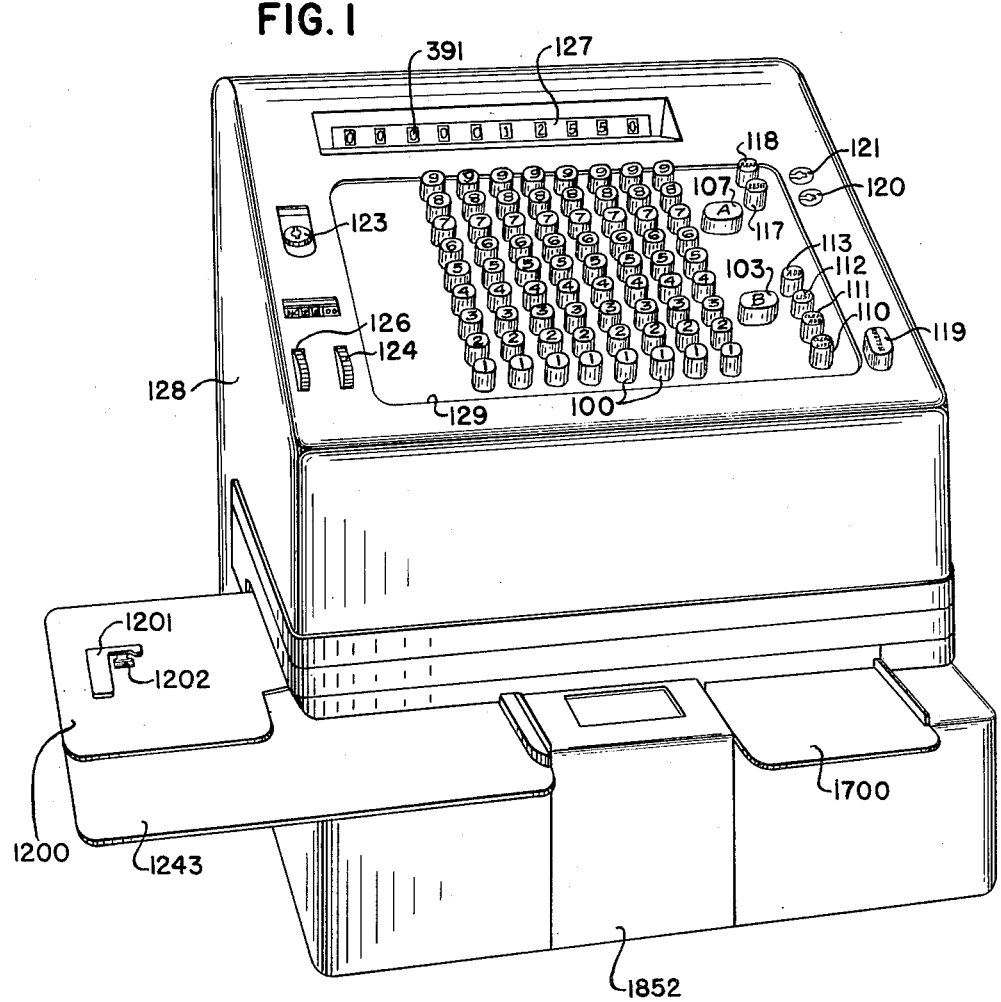
Fig. 1 is a perspective view of the machine enclosed in a cabinet.

The invention illustrated herein is embodied in a machine for use in commercial establishments where bills may be paid, and the bills receipted, at the window where the transaction is consummated; or the customer may mail a check to the store. This type of machine is known in commerce as a "Pay Bill Machine." The printed statements used herein for illustrating the machine operations and functions are of the type generally used by department stores for handling customers' charge accounts.

In the system used by department stores, a statement covering transactions for a thirty-day period is mailed to charge customers. These statements include a detachable stub which the customer may detach and return to the store with his check. The customer may also pay his bills at a cashier's window, either by check or by cash.

When the bill is paid by check, the check is endorsed by the machine at the time the entry of payment is made on the machine, and the endorsement includes a record showing the date, the machine number, the consecutive number of the transaction, a cashier's identification, and the amount credited. The last datum is particularly useful in settling disputes between the customer and the store when the check is made out in an amount larger than the amount to be paid, in which case the customer receives the difference in cash, but when later the customer claims that he did not get credit for the full amount of the check, which may occur when the customer receives his cancelled check from the bank and checks the amount credited to his account, the endorsement on the check, which shows the amount credited, will settle the dispute.

When the bill is paid by mail, the customer sends only the stub with his check and returns the body of the statement for his record. When the bill is paid at the cashier's window, the customer presents the entire statement with the stub attached. In either event, the tendered statement and/or stub are automatically imprinted with a complete record of the transaction, which record includes the date of payment, the cashier's symbol, the machine number, the consecutive number of the transaction, and the amount paid. All this data is also printed on an audit tape, so that a complete check of the transaction can be had by a comparison of the records against each other.

When the statement is presented with the stub attached, the data is printed on both sections—that is, on the stub and on the statement—and, in addition, the statement is receipted by having the word "Paid," together with any other desired data, printed thereon. The printing mechanism for making the above variable records (that is, one print or two prints) and the additional data is controlled by novel feeler mechanisms, controlled on the one hand by the presence or absence of a record on a slip table provided therefor, and on the other hand by whether a stub only or both stub and statement are present on the slip table. Two feelers are provided to obtain this novel control. If only one feeler engages the stub, one impression is made, and, if the feelers engage the stub and the statement, respectively, two impressions are made. If both feelers are free to move their fullest extent, no impression is made.

The checks are endorsed in a separate printing section, and a feeler controls the operation of the check endorsing printing mechanism.

The statement printing mechanism is located at the lower left-hand side of the machine, and the check endorsing mechanism is located at the lower right-hand side of the machine. These printing mechanisms are disclosed in full herein, but the audit tape printing mechanism is not disclosed herein, since it is like that shown in the above-mentioned Goodbar et al. patent.

The machine as illustrated herein is provided with three totalizers, one being a reading totalizer located at the front of the machine near its top and being used for adding and/or listing operations. The other two totalizers are interspersed on a shaft at the rear of the machine, one being assigned to each of two cashiers, designated herein by the symbols "A" and "B" on the keyboard.

Statement printer

In the herein-illustrated system, the machine is adapted to print on statements, illustrated in Figs. 34 and 35. The data to be printed includes the date, the cashier's symbol, the machine number, a consecutive number, and the amount paid, and, when a statement is presented attached to the stub, the word "Paid" is printed, together with any desired data, such as the store's name and a message, as illustrated in Fig. 34. The printing mechanism for printing on the statement is located at the lower left-hand corner of the machine, as viewed in Fig. 1.

In store accounts, the statement, with the stub attached, is mailed to the customer, and in the normal course of business the customer has two ways of paying his bill; that is, either mailing a check with the stub to the store, or bringing the statement to the store and paying in person. In the latter case, the bill may be paid either in cash or by check, and in such case the statement is receipted by the machine at the time the payment is made.

The statement printing mechanism is automatically controlled to print the data either on the stub and on the statement, or on the stub alone, depending entirely on the presence of either the entire statement, or only the stub, in the machine. When the entire statement is on the slip table, the machine automatically prints twice, once on the stub and once on the body of the statement, and line-spaces the statement. If only the stub is positioned in the machine, the data is printed only once, and the statement is not line-spaced.

The number of impressions to be made and the control of the spacing mechanism are controlled by a mechanism controlled by two feelers, which sense for the presence of a stub or of a stub and a statement. If no statement is in the machine, the printing and feeding mechanisms are both disabled.

Statement printing mechanism

Figure 23:
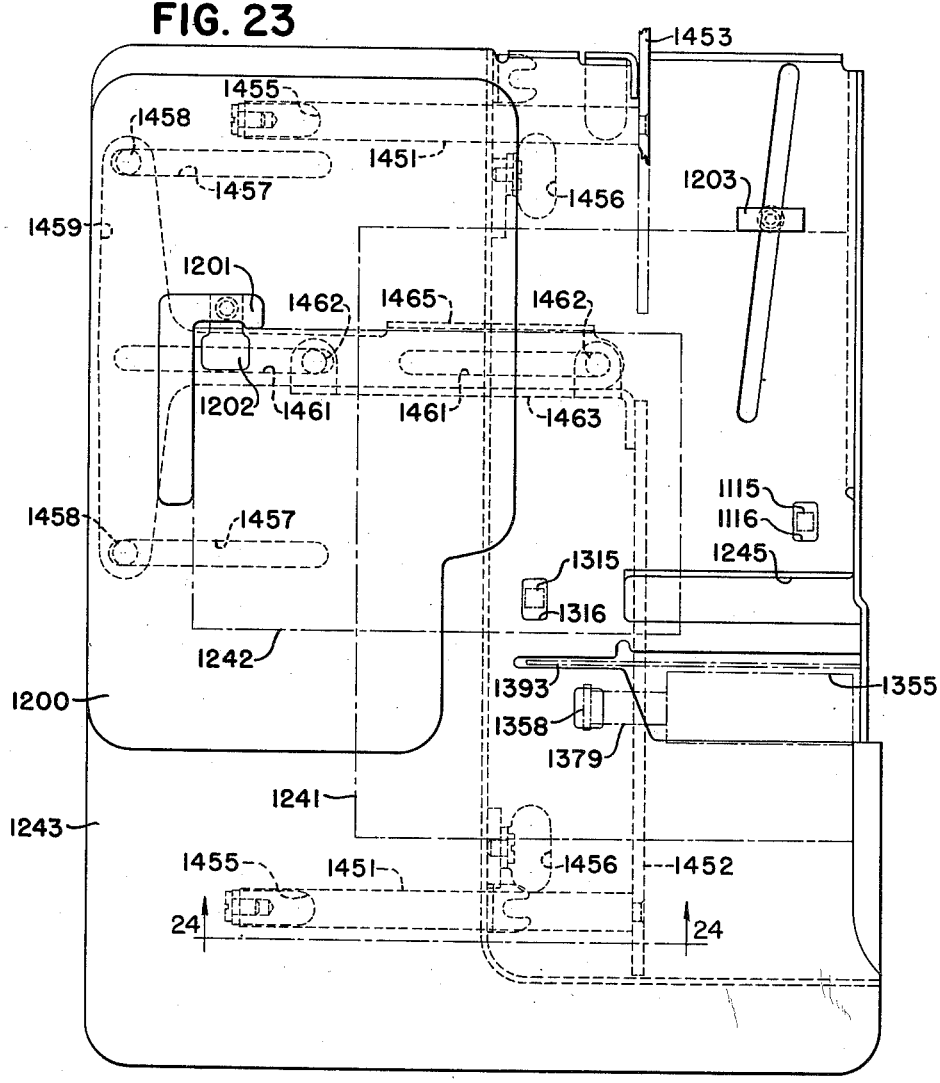
Fig. 23 is a top plan view of the statement and stub supporting table.

The statement 1241 (Fig. 34) or a stub 1242 (Fig. 35) is positioned on a table 1200 (Figs. 1, 3, and 23). The table 1200 is mounted on a fixed table 1243, and mechanism later described shifts the table 1200 to position the statement thereon into printing position. A guide stop 1201 on the table 1200 provides means for aiding the operator to properly locate the stub of the statement on the table, and a spring clip 1202 holds the stub of the statement in proper position thereon. An adjustable stop 1203 aids the operator to properly position the statement and the stub on the table.

In the slip table 1243 is an opening 1245, through which a printing hammer 1246 is moved to carry the inserted statement 1241 or the stub 1242 and a ribbon (not shown) against the type wheels to make an impression. The printing hammer 1246 is carried by a support 1248 (Fig. 10) guided on a stud 1249 carried by a right-hand frame 192 and a similar stud 1249 carried by a left-hand frame (not shown). Each end of the supporting member 1248 is provided with studs 1250 and 1252, which project into a notch 1251 formed in each of the said frames. The studs 1249, 1250, and 1252, therefore, provide a means for guiding the printing platen in its vertical or up-and-down printing movements.

Each stud 1252 (Fig. 10) is engaged by the bifurcated ends of bell cranks 1253 secured to a shaft 1254 pivotally supported in the said frames. Connected to the bell crank 1253, adjacent the frame 192, is a link 1255, the right-hand end of which is slotted to engage over a stud 1256 to guide the link 1255 in its movements. A spring 1257, connected to the link 1255 and a suitable stud on the frame 192, normally maintains the hammer in its lower position, the stud 1256 acting as a stop for the link 1255 when held in its normal position, shown in Fig. 10. The right-hand end 1258 of the link 1255 rests against the side of an arm 1260, and the arm 1260 is provided with a stud 1259, which acts as a pivot between the arm 1260 and a toggle link 1261. The arm 1260 is mounted on a stud 1262, carried by the frame 192. A stud 1263 on the frame 192 acts as a limiting stop for the arm 1260. A second toggle link 1264 is connected to the toggle link 1261 by a stud 1265, and the opposite end of the toggle link 1264 is pivoted to an arm 1266, pivoted on a stud 1267 carried by the frame 192. A stud 1268 on the frame 192 acts as a limiting stop for the arm 1266 when in its home position. The stud 1265 projects laterally from the link 1264 and into a bifurcated end of a cam arm 1269, pivoted on a shaft 1325 carried by the frames of the machine.

Figure 31:
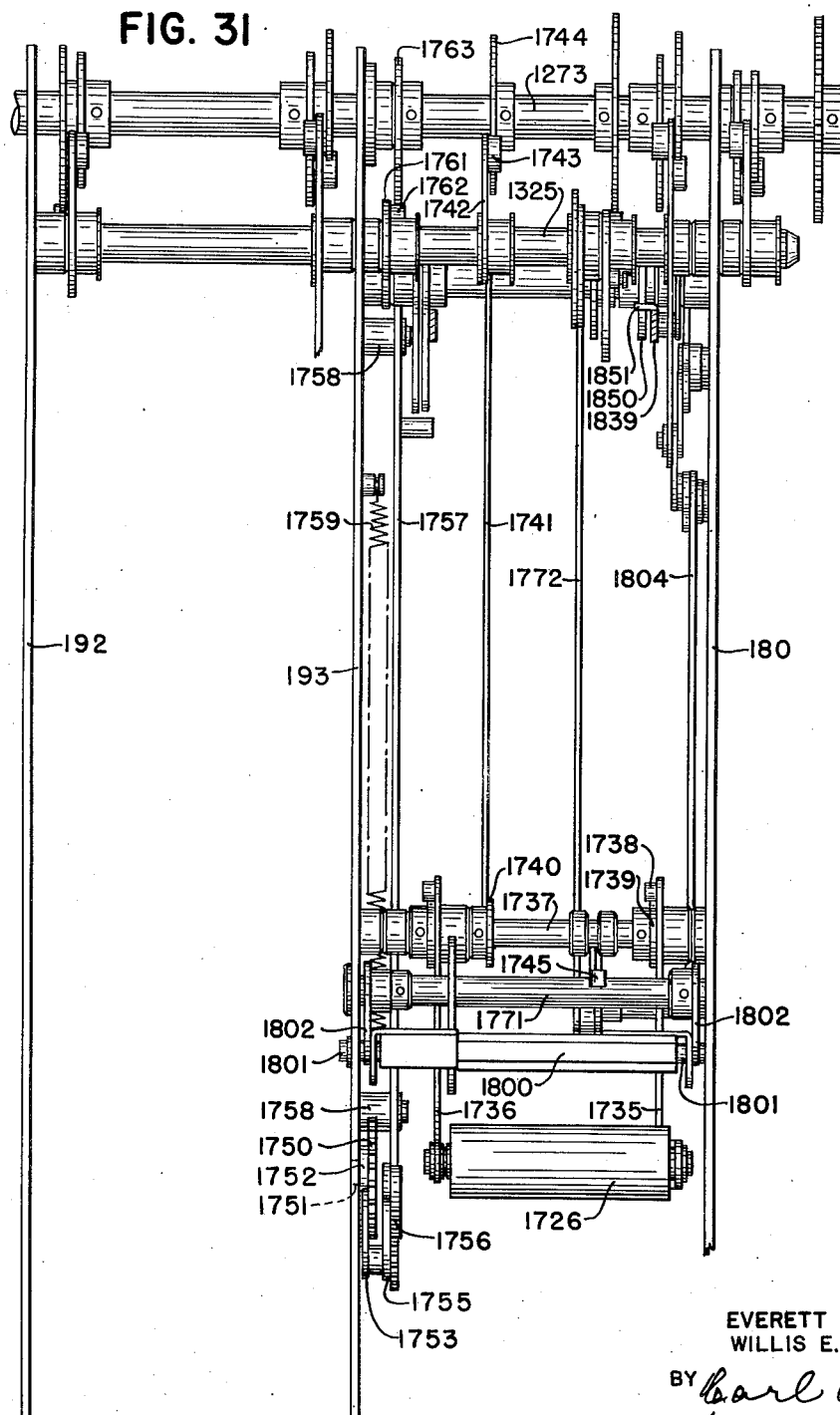
Fig. 31 is a top plan view of the check printing mechanism.

The cam arm 1269 is provided with two anti-friction rollers 1271, which are acted upon by a pair of cams 1272 secured on a printer shaft 1273 (see also Fig. 31).

The printer cam shaft 1273 is rotated from the main cam shaft 229 by the train of gears fully illustrated in said Patent No. 2,616,623. The ratio of the said train of gears is such that one complete rotation of the main cam shaft 229 rotates the printer cam shaft 1273 one complete counter-clockwise rotation (Fig. 10).

Counter-clockwise rotation of the cams 1272 rocks the cam arm 1269 first clockwise and then counter-clockwise, back to its home position. Clockwise movement of the cam arm 1269, acting on the toggle stud 1265, tends to straighten the toggle composed of links 1261 and 1264. If the arm 1266 is held against clockwise rotation, the toggle is straightened and the arm 1260 is rocked counterclockwise. Counter-clockwise movement of the arm 1260 moves the link 1255 toward the left (Fig. 10) to rock the bell cranks 1253 clockwise, which, through the studs 1252, raises the printing hammer 1246 to take an impression from the type wheels onto the statement slip.

The extent of rocking movement of the arm 1269 is such that the toggle links 1261 and 1264 are moved into a horizontal position and beyond to again break the toggle joint. Therefore, when the arm 1269 is restored in a counter-clockwise direction, the toggle links 1261 and 1264 are again straightened before they are broken, upon their return to their normal position. This movement is taken advantage of in controlling the printing hammer for making one or two impressions. The first impression is made when the toggle is straightened during the clockwise movement of the cam arm 1269, and the second impression is made when the cam arm 1269 is returned counter-clockwise to its home position.

Whether the platen is operated to make one impression, two impressions, or no impression at all depends upon whether or not the arm 1266 is blocked against clockwise movement. The blocking of the arm 1266 is effected by a segment 1275, pivoted on a shaft 1276. If the segment 1275 is rocked counter-clockwise before the cam arm 1269 is rocked clockwise, the segment 1275 moves under a stud 1240 on the arm 1266. If the segment 1275 is held under the stud 1240 during both the clockwise and counter-clockwise movements of the cam arm 1269, two impressions will be made. If only one impression is to be made, the segment 1275 is withdrawn from beneath the stud 1240 prior to the counter-clockwise return movement of the cam arm 1269. If, on the other hand, no impression at all is to be made during the machine operation, the segment 1275 is controlled to remain in the position shown in Fig. 26, and therefore no impression will be made during either the clockwise or the counter-clockwise movement of the cam arm 1269.

The selective movement of the segment 1275 is controlled by a notched disc 1278 (Fig. 10). The notched disc 1278 is adjusted under control of the first transaction bank through a square shaft 743, which square shaft is adjusted in a manner described in said Patent No. 2,616,623. The notched disc 1278 is mounted on a disc 1279 and is provided with internal teeth meshing with a pinion 1277 on the square shaft 743, and the disc 1279 is mounted on a shaft 632.

The notched disc 1278 is provided with two notches, one in the "3" or "List" position and the other in the "10" position thereof. Coacting with the periphery of the notched disc 1278 is a feeler mechanism comprising a stud 1281 in the plane of the disc 1278, carried between feeler links 1282 and 1283.

The links 1282 and 1283 are slotted to slide on a stud 1288 at their left ends and are pivoted on an arm 1289 at their right-hand ends. The arm 1289 is pivotally mounted on a shaft 1290, and a rearwardly-extending arm 1291 of the arm 1289 has pivoted thereto a link 1292, the lower end of which is pivoted to the segment 1275. A spring 1293, one end of which is connected to the stud 1288, and the other end of which is connected to the pivot stud on the arm 1289, maintains the arm 1289, the link 1292, and the segment 1275 in their normal, ineffective, positions. In the normal position of the arm 1291, a stud 1294 (see also Fig. 9) thereon rests on a shoulder of an arm 1295, secured to the shaft 1290. Also secured to the shaft 1290 is a cam arm 1296 (see also Fig. 8). The cam arm 1296 is provided with anti-friction rollers 1297, coacting with a pair of cams 1298 on the main cam shaft 229.

During the operation of the main cam shaft 229, the cams 1298 rock the arm 1296 clockwise to rock the shaft 1290 and to thereby lower the arm 1295 (Figs. 9 and 10), thus permitting the spring 1293 to move the arm 1291 and the link 1292, together with the segment 1275, to move the latter beneath the stud 1240, if permitted to do so by a notch in the disc 1278.

If, when the arm 1291 starts to rock clockwise under control of the cams 1298, the stud 1281 contacts the outer periphery of the control disc 1278, the feeler links are immediately arrested, thus preventing the arm 1291 from moving clockwise, thereby holding the link 1292 in its normal position to thereby prevent the segment 1275 from moving beneath the stud 1240. Under this condition, no impression is made when the cam arm 1269 later moves the stud 1265. The resistance met by the stud 1259, due to the spring 1257 and the weight of the parts, including the link 1255, the bell crank 1253, and the hammer 1246, prevents the arm 1260 from rocking counterclockwise. This causes the arm 1266 to rock clockwise, and therefore the link 1255 is not moved to operate the printing hammer.

If, when the arm 1291 is released under control of the cams 1298, the stud 1281 enters a notch in the disc 1278, the arm 1291 is free to rock clockwise, thus lowering the link 1292 and moving the segment 1275 counter-clockwise beneath the stud 1240. Thereafter, upon rocking movement of the arm 1269, the arm 1266 is maintained against clockwise rotation, and therefore the toggle consisting of the links 1261 and 1264 is straightened to rock the arm 1260 to shift the link 1255 and the bell crank 1253 to raise the printing hammer 1246 to make an impression.

If the stud 1281 remains in a notch of the disc 1281 during the entire machine operation, the segment 1275 remains under the stud 1240 during both the clockwise and counter-clockwise movements of the cam arm 1269, and therefore two impressions are made, one during the clockwise movement of the arm 1269 and the other during its counter-clockwise movement. This operation is effected when the statement, with its stub (Fig. 34), is on the slip table.

After the two impressions have been made, the cams 1298, coacting with the rollers 1297, restore the cam arm 1296, the shaft 1290, and the arm 1295 counter-clockwise to their home positions. During this movement, the arm 1295, engaging the stud 1294, restores the arm 1291, the link 1292, and the segment 1275 to their home positions.

In operation of the machine when the stub only (Fig. 35) is on the slip table, a means presently described, which is under control of a sensing mechanism, withdraws the segment 1275 from beneath the stud 1240 after the first impression has been made. The sensing means controls the positioning of an arm 1204 (Fig. 11) pinned on the shaft 1276 to move beneath a flange 1336 on the link 1292. With the arm 1204 thus positioned, the downward movement of the link 1292 is arrested before the stud 1281 (Fig. 10) reaches the full depth of the notch in the disc 1278, and therefore the arm 1291 is not moved as great an extent as when the stud 1281 moves into the bottom of the notch. When this condition exists and the cam arm 1296 is rocked clockwise to rock the shaft 1290 and the arm 1295 likewise, the arm 1291 and the link 1292 are arrested by the arm 1204. Upon continued movement of the arm 1295, after the link 1292 is arrested, a surface 1300 of the arm 1295 (Fig. 9) is moved beyond a stud 1301 of a pawl 1302 pivotally mounted on a stud 1303, which forms a pivot point between the arm 1291 and the link 1292. A spring 1304, stretched between the stud 1301 and the stud 1294, normally tends to rock the pawl 1302 clockwise. Therefore, when the surface 1300 moves beyond the stud 1301, the spring 1304 rocks the pawl 1302 clockwise to follow the inclined surface 1305 of the arm 1295. This clockwise movement of the pawl 1302 positions its end 1306 into the path of a finger 1351 of a cam arm 1350, pivoted on the shaft 1290, the latter having a roller 1349 held in engagement with a cam 1348 (Fig. 10), on the main cam shaft 229, by a spring like the spring 1293. The cam 1348 permits the arm 1350 to rock first clockwise under the influence of said spring and then back to home position. When the cam 1348 restores the cam arm 1350 to its home position, the finger 1351 engages the end 1306 of the pawl 1302 and moves the pawl 1302, together with the link 1292, upwardly. This movement takes place prior to the time the cam arm 1269 receives its counter-clockwise movement, and therefore, when the link 1292 is moved upwardly by the finger 1351, the segment 1275 is withdrawn from beneath the stud 1240. Therefore the second impression does not take place.

When the arm 1204 remains in normal position, shown in Fig. 11, the link 1292 partakes of the entire movement of the arm 1295, and therefore the surface 1300 is never withdrawn from contact with the stud 1301, and the end 1306 of the pawl 1302 remains out of the path of the finger 1351. During the restoring movement of the arm 1350, the finger 1351 does not contact the end 1306 of the pawl 1302, and therefore the link 1292 is restored to its home position after the second impression has been made, in the manner described above.

As shown in Fig. 10, the disc 1278 is notched, so that, if no key is depressed in the first transaction bank, a notch is positioned in the path of the stud 1281, as shown by position 10; or, if the "List" key 112 is depressed, a notch is positioned into the path of stud 1281, as shown by position 3 of Fig. 10. Therefore the only operations in which two impressions can be made are either with the "List" key 112 depressed, or with no key depressed in the first transaction bank. These controls are further subject to the controls by two sensing means, which determine whether one impression, two impressions, or no impression is made, in the manner described hereinafter.

*Statement and stub feeling mechanisms*

Two feeling mechanisms are provided in the machine to control the operations of the printing hammer, so that, when a complete statement 1241 is on the table 1243 (Fig. 23), two impressions are made; when a stub 1242 (Fig. 23) is on the table 1200, only one impression is made; and when no statement or no stub is on either table, the hammer is disabled to prevent smudging the printing hammer.

A feeler 1315, hereinafter referred to as the left-hand feeler (Fig. 23), when arrested by either a statement or a stub, sets controls to cause two printing operations. A feeler 1115, hereinafter referred to as the right-hand feeler, when not arrested by a statement, modifies the controls over the printing hammer so that only one printing operation is effected. When the feeler 1115 is not arrested, which normally causes one impression to be made, and the feeler 1315 is also not arrested, the feeler 1315 modifies the control over the printing hammer so that no impression is made.

To recapitulate:

1. Both feelers are arrested—two prints
2. Both feelers rise—no prints
3. Feeler 1315 is arrested and feeler 1115 rises—one print

*Left-hand feeler 1315*

One feeling mechanism includes the left-hand feeler 1315 (Figs. 19 and 23), which is arranged to enter an opening 1316 of the table 1243 to feel for the presence of a statement or a stub. If no statement or stub is on the table and the machine is operated, the slip feeler 1315 is raised its greatest extent to present an obstruction into the path of the flange 1336 on the link 1292 (Fig. 11) to prevent the segment 1275 (Fig. 10) from moving beneath the stud 1240, so that the toggle links 1261 and 1264 will not actuate the arm 1260, the link 1255, and the hammer 1246.

The feeler 1315 (Fig. 19) is guided in its upward and downward movements by a stud 1314, carried by an arm 1313, supported on shafts 1254 and 1317. The lower end of the slip feeler 1315 is pivoted to a bell crank 1318, on a shaft 1319. The upper arm of the bell crank 1318 has connected thereto a link 1323, and the opposite end of the link is connected to an arm 1324 pivoted on the shaft 1325 (see also Fig. 22). The arm 1324 has a finger 1326, which is normally held against a flange 1327 (Fig. 19) of a pawl 1328, pivoted on a stud 1329 of a cam follower arm 1330, by a spring 1320. The flange 1327, therefore, provides a means for locating the feeler 1315 in respect to the table 1243. The cam follower arm 1330 is pivoted on the shaft 1325 and is provided with an anti-friction roller 1331, held in engagement with a cam 1332 on the printer cam shaft 1273 by a spring 1333 (see also Fig. 18), stretched between a stud on the arm 1330 and a stud on an arm 1334, pivoted on the shaft 1276.

Hubbed to the arm 1334 is an arm 1312, connected to one arm of a yoke 1311 by a stud 1310. Formed on a second arm of the yoke 1311 (Fig. 11) is a segment 1335, located in respect to the flange 1336 on the link 1292, so that, upon the segment 1335 being rocked counter-clockwise, the segment moves beneath the flange 1336 and prevents downward movement of the link 1292. The arm 1334 is integral with an arm 1337 (Fig. 18), the arm 1337 being provided with a stud 1338, which projects into a notch in an arm 1339, pivotally mounted on the shaft 1325. The arm 1339 is integral with a segment 1340, the outer periphery 1341 of which is slightly lower than the periphery 1342 of the arm 1324 (Fig. 22).

When the printer cam shaft 1273 is rotated counter-clockwise (Fig. 19), the spring 1333 rocks the cam follower arm 1330 counter-clockwise to carry the pawl 1328 and its flange 1327 away from the finger 1326 of the arm 1324. Movement of the flange 1327 away from the finger 1326 releases the arm 1324 and the link 1323 to the action of the spring 1320, rocking the bell crank 1318 clockwise to raise the feeler 1315 to feel for a statement or a stub in the machine. If no statement or stub is present on the table 1243 or 1200, respectively, the feeler 1315 is permitted to rise its fullest extent, and therefore the spring 1320 moves the link 1323 to the right (Fig. 19) to cause the finger 1326 to follow the flange 1327. Counter-clockwise movement of the cam follower arm 1330 to its fullest extent moves the flange 1327 beyond the surface 1341 (Fig. 18), whereupon the flange 1327 drops behind a surface 1343 of the segment 1340. This movement is permitted by a notch 1344 in the arm 1324 and is effected by a spring 1345 stretched between a stud on the pawl 1328 and a stud on the cam arm 1330. When the flange 1327 is in the notch 1344 and behind the surface 1343 of the segment 1340, and the cam arm 1330 is restored to its home position by the cam 1332, the pawl 1328 rocks the segment 1340 clockwise, thus rocking the arm 1337 and the yoke 1311 counter-clockwise (Figs. 11, 18, and 19). Counter-clockwise movement of the yoke 1311 moves the segment 1335 (Fig. 11) beneath the flange 1336 to prevent downward movement of the link 1292 to hold the segment 1275 (Fig. 10) in normal position, which prevents operation of the printing hammer in the manner described hereinbefore.

If a statement is present on the table 1243, then, when the feeler 1315 begins to rise, the feeler is arrested by coming into contact with the inserted statement, and therefore the feeler 1315, the bell crank 1318, the shaft 1319, the link 1323, and the arm 1324 are arrested. Thereafter, when the cam arm 1330 is rocked counter-clockwise, the flange 1327 of the pawl 1328 rides on the periphery 1342 of the segment 1324; and the flange 1327 cannot drop into the notch 1344 and into the path of the surface 1343 of the segment 1340. If the flange 1327 cannot drop into the notch 1344, the flange 1327 is held out of the path of the surface 1343 of the segment 1340, and therefore, upon return movement of the cam arm 1330, the flange of the pawl 1328 does not rock the segment 1340, which results in the yoke 1311 being held stationary, and the segment 1335 (Fig. 11) is held out of the path of the flange 1336 of the link 1292. Therefore, when a statement is on the slip table 1243, the link 1292 is free to operate to control the operation of the printing hammer to make two impressions, in a manner described hereinbefore.

The feeler 1315 is restored to normal position by the pawl 1323 engaging the finger 1326 during its clockwise rotation, to rock the arm 1324 and shift the link 1323 and the arm 1318, thus lowering the feeler 1315. At the end of the operation of the machine during which the segment 1340 was moved by the pawl 1328, the segment 1340 and its connected elements remain in the moved positions. If during the next operation the feeler 1315 is arrested by a statement, the arm 1324 does not move, and, therefore, when the pawl 1328 is moved counter-clockwise (Fig. 19) by the cam 1332 and the follower arm 1330, the flange 1327, engaging a cam edge of the notch 1344, forces the flange 1327 out of the notch to withdraw the flange 1327 from engagement with the surface 1343 of the segment 1340 to permit the spring 1333 to restore the segment 1340 and the yoke 1311 to normal position, shown in Fig. 18.

*Right-hand Feeler 1115*

The right-hand feeling mechanism includes the feeler 1115 (Figs. 6 and 23), which is arranged to enter an opening 1116 of the table 1243 to feel for the presence of a statement. Normally, the stub 1242 is out of the path of movement of the feeler 1115, as indicated by chain lines in Fig. 23, so that the only condition under which the feeler 1115 is arrested is when a complete statement is on the table 1243. If no statement or stub is on the table, the feeler 1315 controls the operation of the printing hammer to prevent printing, as described above. However, if a stub 1242 is on the table 1200, the feeler 1115 modifies the controls over the printing hammer to prevent a second impression from being made.

When a stud 1242 is on the table 1200, no statement 1241 is placed thereon, and, since the stub 1242 does not extend to the path of the feeler 1115, the feeler will rise to its fullest extent. When this occurs, the arm 1204 (Fig. 11) is moved into the path of movement of the flange 1336 of the link 1292. At this time, the arm 1335 is out of the path of movement of the flange 1336, where it was set under control of the feeler 1315 in the manner described above. The arm 1204 controls the printing mechanism in the manner described above by causing the withdrawal of the segment 1275 from beneath the stud 1240 after the first impression has been made.

The arm 1204 is positioned under control of the feeler 1115. The feeler is guided in its upward and downward movements by the beforementioned shaft 1254 (Fig. 6) and a shaft 1317, carried by the frames 181 and 192. The lower end of the feeler 1115 is pivoted on an arm 1118 of a yoke pivoted on the shaft 1319. The arm 1118 has connected thereto a spring 1120, the other end of which is connected to a stud 1121 on the frame 192. A second arm 1122 of the yoke has one end of a link 1123 pivoted thereto, and the opposite end of the link 1123 is connected to an arm 1124, pivoted on the shaft 1325. See also Fig. 5. The arm 1124 is provided with a finger 1126, which is normally held against a flange 1127 on a pawl 1128, pivoted on a stud 1139 of a cam follower arm 1130, by the spring 1120. The flange 1127, therefore, provides a means for locating the feeler 1115 in respect to the table 1243. The cam follower arm 1130 is pivoted on the shaft 1325 and is provided with an anti-friction roller 1131, held in engagement with a cam 1132 on the printer cam shaft 1273 by a spring 1133 stretched between a stud on the arm 1130 and a stud on an arm 1134, secured to the shaft 1276 (see also Fig. 4).

Also secured to the shaft 1276 is the beforementioned arm 1204, so located in respect to the flange 1336 on the link 1292 that, upon the arm 1204 being rocked counter-clockwise (Fig. 11), the arm 1204 moves into the path of movement of the flange 1336 and limits the downward movement of the link 1292 to control the operation of the printing hammer in the manner described above, to obtain one printing operation.

The arm 1134 is integral with an arm 1137 (Fig. 4), the arm 1137 being provided with a stud 1138, which projects into a notch in an arm 1139, pivotally mounted on the shaft 1325. The arm 1139 is integral with a segment 1140, the outer periphery 1141 of which is slightly lower than the periphery 1142 of the arm 1124 (Fig. 5).

When the printer cam shaft 1273 rotates counter-clockwise (Fig. 6), the spring 1133 rocks the cam follower arm 1130 counter-clockwise to carry the pawl 1128 and its flange 1127 away from the finger 1126 of the arm 1124. Movement of the flange 1127 away from the finger 1126 releases the arm 1124 and the link 1123 to the action of the spring 1120, thus rocking the yoke 1118 clockwise (Fig. 6) to raise the feeler 1115 to feel for a statement on the table 1243. If no statement is present, the feeler 1115 is permitted to rise to its fullest extent. Therefore the spring 1120 moves the link 1123 to the right (Fig. 6) to cause the finger 1126 to follow the flange 1127. Counter-clockwise movement of the cam follower arm 1130 to its fullest extent moves the flange 1127 beyond the surface 1141 (Fig. 4), whereupon the flange 1127 drops behind a surface 1143 of the segment 1140. This movement is permitted by a notch 1144 in the arm 1124 and is effected by a spring 1145, stretched between a stud on the pawl 1128 and a stud on the cam follower arm 1130. When the flange 1127 is in the notch 1144 and behind the surface 1143 of the segment 1140, and the cam follower arm is restored to its home position by the cam 1132, the pawl 1128 rocks the segment 1140 clockwise, thus rocking the arm 1137 and the shaft 1276 counter-clockwise (Figs. 4, 6, and 11). Counter-clockwise movement of the shaft 1276 moves the arm 1204 (Fig. 11) into the path of movement of the flange 1336 to limit the downward movement of the link 1129 to place the setting controls of the segment under control of the mechanism shown in Fig. 10, as fully described above in the description of the printing operations, to cause only one printing operation of the printing hammer 1246.

If a complete statement is on the table 1243, then, when the feeler 1115 begins to rise, the feeler 1115 is arrested by coming into contact with the inserted statement. Therefore the feeler 1115, the yoke 1118, and the link 1123, and the arm 1124 are arrested. Therefore, when the cam follower arm 1130 is rocked counter-clockwise, the flange 1127 of the pawl 1128 rides on the surface 1142 of the arm 1124, and the flange 1127 cannot drop into the notch 1144 and into the path of the surface 1143 of the segment 1140. Therefore, upon return movement of the cam follower arm 1130, the flange 1127 of the pawl 1128 does not rock the segment 1140, which results in the shaft 1276 being held stationary and the arm 1204 (Fig. 11) being held out of the path of movement of the flange 1336 of the link 1292. Therefore, when a statement is on the slip table 1243, both arms 1204 and 1335 are held out, and the link 1292 is free to operate to control the operation of the printing hammer to make two impressions thereon in the manner described hereinbefore.

To recapitulate:

1. When both segments 1204 and 1335 are held in normal positions by feelers 1115 and 1315 sensing a statement, two impressions are made.
2. When segment 1335 is moved into the path of the flange 1336 under control of the feeler 1315, when sensing no slip, no impression is made.
3. When segment 1335 is held in normal position under control of feeler 1315, and segment 1204 is moved into the path of flange 1336 under control of feeler 1115, one impression is made.

By referring to Fig. 23, where the stub 1242 is indicated by chain lines, it will be noted that the stub is not in position to be printed upon by the hammer 1246. Mechanism described later, which is under control of the feelers 1115 and 1315, shuttles the stub 1242 into position to receive the printed records and back to the original position, shown.

*Statement feed tension rollers*

In order to space the printed data on the complete statement (Fig. 34), so that the two impressions can be made, one on the main portion thereof and one on the stub portion, mechanism is provided for feeding the statement between the two impressions. The effectiveness of the feed mechanism is controlled by the feeler 1115 and by a notched disc, as described hereinafter. The feed rollers are normally separated, so that the statement can be easily inserted into the machine. Immediately after the machine begins to operate, the feed rollers are brought together to grip the inserted statement, not only during the feeding movements but also at the time the printing takes place, to maintain the inserted statement in proper position.

The mechanism for controlling the tension rollers is shown in Fig. 15. An upper feed roller 1355 is rotatably mounted on the stationary shaft 204. A tension roller 1356 (Figs. 3 and 7) is movable to come into contact with the stationary roller 1355 after the feelers have been operated.

The tension feed roller 1356 is rotatably mounted on a shaft 1358, carried by two arms 1359, rotatably mounted on the beforesaid shaft 1317. Also secured to the shaft 1317 are two arms 1360, each being engaged by a stub 1357, one on each arm 1359. Also secured to the shaft 1317 is an arm 1354, which is connected to a cam arm 1361 by a link 1362. The cam arm 1361 is provided with an anti-friction roller 1363, held in engagement with a cam 1364, secured to the printer shaft 1273. A spring 1365, connected at one end to one of the arms 1359 and at the other end to a stud on the frame 181, and acting through the studs 1357, the arm 1360, and the link 1362, normally maintains the roller 1363 in contact with the periphery of the cam 1364. When the cam 1364 is in its home position, as shown in Fig. 15, the tension roller 1356 is in its lower position and out of contact with the stationary feed roller 1355, thus clearing the opening for insertion of the statement into proper position for receiving the impression.

When the link 1362 is released for operation in the manner described presently and the cam 1364 rotates counter-clockwise, the spring 1365 rocks the cam arm 1361 clockwise, which movement, through the link 1362 and the arm 1360, transmits similar clockwise rotation to the shaft 1317, thus raising the roller-supporting arms 1359 to bring the tension rollers 1356 into contact with the inserted statement and pressing it against the stationary feed roller 1355. Near the end of the machine operation, after all impressions have been made, the cam 1364 rocks the cam arm 1361 counter-clockwise to restore the tension feed roller 1356 to its normal position, shown in Fig. 15.

As illustrated herein, the tension roller 1356 is moved into feeding position only in operations of the machine during which a statement is on the table 1243 and when no key in the first transaction bank is depressed or the "List" key 112 of the first transaction bank is depressed. In either of these operations, a notched disc 1150 (Fig. 15) positions a notch into the path of a feeler to control the release of the link 1362, and the statement feeler senses for the presence of a statement on the table 1243.

As described above, when the feeler 1115 is arrested by contacting an inserted statement, the shaft 1276 is not rocked during the ensuing machine operation. However, when the feeler 1115 moves its fullest extent—that is, when no statement is on the table 1243—mechanism shown in Fig. 6 rocks the shaft 1276 in the manner described above.

When the shaft 1276 is rocked due to the absence of a statement from the table 1243, a hook 1369 (Fig. 15), secured to the shaft 1276, is lowered to engage a stud 1368 on the link 1362, thus preventing movement of the tension roller 1356 into its feeding position.

A second hook 1367 (Fig. 15), being a part of a yoke 1366 loose on the shaft 1276, normally engages the stud 1368 to prevent movement of the link 1362. The hook 1367 is movable under control of the notched disc 1150, the disc being adjusted under control of the keys of the first transaction bank through the square shaft 743, the latter having a pinion 1151 thereon meshing with internal teeth 1152 on the inner periphery of the disc 1150. When no key in the first transaction bank is depressed, a notch 1153 is moved into position to control a feeler 1154, and, when the "List" key 112 is depressed, a notch 1155 is moved into position to control the feeler 1154.

The feeler 1154 is slidably mounted on a stud 1156 and is also pivoted on one arm of a yoke 1157. A second arm of the yoke 1157 supports the upper end of a link 1158, the lower end of which is pivoted on an arm 1159 of the yoke 1366, the latter being a part of the hook 1367. A spring 1160 urges the yoke 1157 clockwise, but the yoke is normally restrained by a stud 1161 of the yoke resting on an arm 1162, secured to the before-mentioned shaft 1290 (Fig. 8).

When the shaft is rocked, as described hereinbefore, by the cams 1298, the spring 1160 urges the feeler toward the disc 1150. If the feeler is arrested by the outer periphery of the disc, the hook 1367 remains in the path of the stud 1368, and therefore the disc is arrested to prevent the tension roller from moving into feeding position.

However, when a notch 1153 or 1155 is in the path of movement of the feeler 1154, the yoke 1157 rocks, when released by movement of the arm 1162, to lower the link 1158 and, through yoke 1366, lower the hook 1367 out of the path of movement of the stud 1368. This permits movement of the link 1362 under control of the cam 1364 to move the tension roll 1356 into feeding position.

*Statement feed mechanism*

After the tension rolls 1356 are rocked to their upper positions by the cam 1364 and the connecting mechanism therebetween, and after the first impression has been made upon the main section of the statement, the feed roller 1355 is given a clockwise rotation to feed the statement an extent sufficient to present the stub section of the statement to the printing position.

The mechanism for feeding the statement is normally effective to rotate the feed roller 1355 but is controlled from the right-hand feeler 1115, so that the feed mechanism will be operative only during the machine operation in which a statement 1241 is on the table 1243, but not when a stub 1242 is on the table.

Secured to the feed roller 1355 is a pinion 1353, which meshes with an idler pinion 1370 on a stud 1371, and the pinion 1370 meshes with a pinion 1372, secured to a shaft 1373. Also secured to the shaft 1373 is a ratchet wheel 1374, having three ratchet teeth 1375, one of which is normally engaged by a ratchet pawl 1376, in which position the pawl is held by a spring 1377. The pawl 1376 is pivoted on the end of an arm 1378, rotatably mounted on the shaft 1373. A hub 1379 (Fig. 7) connects the ratchet arm 1378 to a segment pinion 1380. The teeth of the segment pinion mesh with teeth of a rack formed on the end of a link 1381, slidably mounted on two studs 1382. The right-hand end (Fig. 17) of the link 1381 is held against a roller 1383 by a spring 1384, having one end connected to a stud on the link 1381 and the other end connected to the framework of the machine.

The roller 1383 is carried on the free end of a cam follower arm 1385, pivoted on the shaft 1325. The cam follower arm 1385 is provided with an anti-friction roller 1386, held against a cam 1387, secured to the printer cam shaft 1273, by the spring 1384 and the slide 1381.

When the printer cam shaft 1273 is rotated, the cam follower arm 1385 is moved under control of the cam 1387, and the link 1381 is moved therewith under the tension of spring 1384. Movement of the link 1381 rotates the shaft 1373 counter-clockwise (Fig. 17) and the arm 1378 and the ratchet pawl therewith until the ratchet pawl 1376 drops into another notch 1375. Upon return movement of the link 1381 by the cam 1387, the ratchet pawl 1376 rotates the shaft 1373 and the pinions 1372, 1370, and 1353, to rotate the latter and the feed roller 1355 thereon clockwise (Fig. 17) to feed the statement far enough to position the stub thereon into printing position.

The ratchet pawl 1376 has a flange 1388, which moves behind a flange 1389 of a plate 1390 (Fig. 21), mounted on the shaft 1373 and secured to the frame 181. This provides a means to lock the ratchet pawl 1376 in a respective notch 1375 during its oscillating movements to prevent accidental disengagement thereof.

The feed roller 1355 may be recessed to receive a porous rubber printing member 1415 to print data on the statement as it is being fed, as, for example, illustrated in Fig. 34, below the line of printing from the type line.

The porous rubber printing member 1415 (Fig. 15) is reinked during each machine operation by an inking means including a hollow cylinder 1505, containing a supply of ink 1506 therein. The cylinder 1505 is covered with a porous rubber sleeve 1507, capable of absorbing ink from the supply 1506 through a series of small openings 1508, which provide communication between the ink supply and the inner wall of the sleeve 1507. The ink is carried to the outer wall of the periphery through the micropores by capillary attraction. The cylinder 1505 is provided at one end thereof with an opening, through which the supply of ink can be replenished. The construction of the cylinder is substantially like that shown in United States Patent No. 2,007,588, issued to William B. Wescott on July 9, 1935; and the porous rubber sleeve thereon and the porous printing element are made according to the disclosure in United States Patent No. 2,554,485, issued to Galen J. Wilson on May 29, 1951.

The inking means is normally out of engagement with the printing member 1415 and is lowered (Fig. 15) into engagement therewith by any suitable means (not shown) at the proper time during the machine operation.

The above inking means may also be supplied for inking the electrode 1745 (Fig. 27), and the latter may be made of porous rubber if desired.

*Statement feed throwoff*

When no statement is on the table 1243, it is desirable to throw off the statement feed mechanism. This result is obtained under control of the right-hand feeler 1115, which, as explained above, moves its greatest extent when no statement is on the table 1243, and, when this occurs, the shaft 1276 is rocked counter-clockwise (Fig. 6) by the mechanism illustrated in Fig. 6.

When the shaft 1276 is rocked counter-clockwise (see also Fig. 17), an arm 1391 on the shaft is moved behind a stud 1392 on the link 1381, to arrest the cocking movement of the feeding mechanism, thus preventing feeding movement of the feed roller 1355.

Also, when a stub 1242 is on the table 1243, the feeler 1115 moves its greatest extent, so that, during operations in which a stub 1242 is on the table 1243, the feeding mechanism for the statement is thrown off.

*Perforating mechanism*

If desired, the machine may be provided with a perforating mechanism to aid the operator to sever the stub 1242 from the complete statement after the data has been recorded thereon.

As illustrated in Figs. 3, 13, 14, and 23, a perforator knife 1393 is located between the hammer 1246 and the feed roller 1356, and the perforator knife is timed to operate near the end of the machine operation after the statement has been fed into position for the second impression. The knife 1393 is secured to a supporting bar 1394, and both are slidably supported in a frame 1395 by two screws, or bolts, 1396, and guided by a stud 1397. The knife 1393 and the bar 1394 are further supported on a bracket 1398, which moves therewith. The bracket 1398 has formed thereon, at the lower end, two ears 1399, which support a rod 1400. Each stud 1400 is engaged by the bifurcated end of a bell crank 1401, and both bell cranks are pinned to the shaft 1319. The shaft 1319 has secured thereto an arm 1402, the free end of which has pivoted thereto the left-hand end (Fig. 13) of a link 1403. The ends of the rod 1400 extend into slots 1404 in each frame 181 and 192, and the slots form a limiting means for the bell cranks 1401 when biased by springs 1405, secured to each bell crank. In this manner, the knife is held in its downward, or home, position and also locates a notch 1406 in the link 1403 in alignment with a stud roller 1407 on a cam follower arm 1408 pivoted on the shaft 1325. The cam follower arm 1408 is provided with two anti-friction rollers 1409 engaging cam plates 1410.

With the parts described in normal position—that is, with the notch 1406 held out of engagement with the roller 1407—the perforator mechanism is not operated. This condition will be maintained, when no statement is on the table 1243, by an arm 1411 (Fig. 12) secured to the beforementioned shaft 1276. The shaft is rocked counter-clockwise (Fig. 12) under control of the right-hand feeler 1115, in the manner described hereinbefore, when the feeler 1115 moves its greatest extent, due to the absence of a statement from the table 1243.

When the arm 1428 is rocked, it is moved beneath a flange 1429 (see also Fig. 13) on a link 1430. The lower end of the link 1430 is bifurcated to slidably engage the shaft 1276, and its upper end is pivoted to an arm 1431. A link 1432 connects the arm 1431 and the link 1430 to the link 1403, to normally maintain the latter in a position in which the notch 1406 is disengaged from the roller 1407. The links 1430 and 1432 are held in normal position by a stud 1433 on the arm 1431 resting on a ledge 1434 of the arm 1296. A spring 1435, connected to an arm 1436 connected to the arm 1431 on the shaft 1290, maintains the stud 1433 in engagement with the ledge 1434.

When the cams 1298 rock the arm 1296 in the manner described hereinbefore, the ledge 1434 is lowered to lower the links 1430 and 1432 to engage the notch 1406 with the roller 1407. However, if the arm 1428 is in the path of movement of the link 1430, the link 1430 and consequently the link 1432 are arrested, thus preventing engagement of the notch 1406 with the roller 1407.

From the above it is apparent that, when no statement is on the table 1243, the feeler 1115 will cause the arm 1428 to prevent coupling of the link 1403 with the cam follower arm 1408, and, therefore, the knife will not be operated. If a statement is on the table 1243, the arm 1428 is not rocked, and the link 1403 is coupled to the cam follower arm 1408.

When the cams 1410 actuate the cam follower arm 1408, with the link 1403 coupled thereto, the link is shifted rightwardly to rock the arms 1402 and 1401 to thereby lift the frame 1398. This carries the knife 1393 and the bracket 1395 upwardly until the bracket 1395 engages a rubber pad 1437 with the statement, which is thereby impinged against an anvil 1438, and thereafter the knife ascends relatively to the bracket 1395 and carries the knife through the statement and into a groove in the anvil. As illustrated in Fig. 14, the knife is provided with perforating teeth having notches to space the teeth so that the stub is not severed completely from the statement.

Springs 1439 provide a resilient connection between the knife frame 1398 and the bracket 1395, and the studs 1396 and 1397, operating in slots in the bracket 1395, provide for relative movement between the knife 1393 and the impinging device 1437.

*Stub shuttle mechanism*

When a stub 1242 is placed in the machine, it must be positioned out of range of the right-hand feeler 1115 to permit the feeler to effect the various controls described above. As shown in chain lines in Fig. 23, the stub 1242 is to the left of the printing position—that is, to the left of the opening 1245, through which the hammer 1246 passes to make an impression on the stub. To move the stub into printing position after the feeler 1115 has effected its controls and has thereafter been retracted, a shuttle mechanism is provided to move the stub into printing position. The shuttle mechanism is timed to operate before the printing operation is made. The shuttle mechanism is shown in detail in Figs. 16 and 20.

Figure 24:
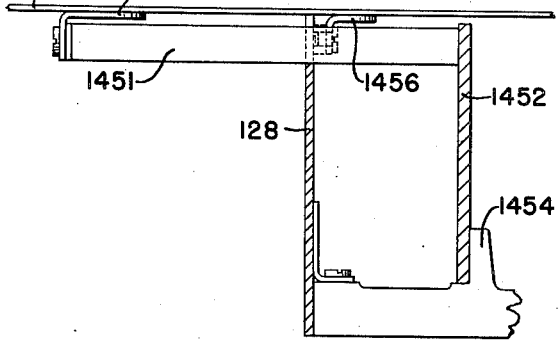
Fig. 24 is a detailed cross-section view taken on lines 24—24 of Fig. 23.

The shuttle mechanism includes the beforementioned table 1200 (Figs. 16, 20, and 23), which rests on the fixed table 1243. The table 1243 is supported on two square studs 1451 (see also Fig. 24), one secured to a frame 1452, and the other one being secured to a frame 1453. The frames 1452 and 1453 are mounted on a machine base 1454. The studs 1451 project through notches cut in the cabinet 128 of the machine. Angle clips 1455 are welded to the under side of the table, by means of which the table 1243 is secured to the free ends of the studs 1451. Also welded to the under side of the table 1243 are two angle clips 1456, by means of which the table is secured to the cabinet 128.

The table 1243 is provided with two slots 1457, through which two studs 1458, secured to the shuttle table 1200, pass. The lower ends of the studs 1458 project into holes in a T-shaped rack 1459, and washers 1460 hold the T-shaped rack on the studs 1458. The T-shaped rack is provided with two slots 1461 to provide a sliding support on studs 1462, carried on a bracket 1463, secured on the frame 1452 by a flange 1464 thereon.

The T-shaped rack is provided with teeth 1465 in mesh with a segment 1466 rotatably mounted on a stud 1467 on the bracket 1463. A hub 1468 connects the segment 1466 to a segment 1469, which meshes with a segment 1470 pivoted on a stud 1471 carried by the bracket 1463. The segment 1470 has an arm to which the lower end of a link 1472 is pivoted. The link 1472 is also pivoted to one arm of a bell crank 1473, pivoted on a stud 1474, carried by the frame 1453. The bell crank 1473 is connected to a cam follower arm 1475 on the shaft 1325 by a link 1476. A spring 1477, connected to the link 1476, maintains an anti-friction roller 1478 in contact with a cam 1479 on the shaft 1273.

When the link 1476 is free to operate and the cam 1479 rotates during a machine operation, the cam follower arm 1475 rocks on the shaft 1325 to move the link 1476 and rock the bell crank 1473 to raise the link 1472. The link 1472, through the segments 1470, 1469, and 1466, shuttles the table 1200 to the right (Figs. 20 and 23) to move the stub on the table into printing position. After the impression has been made on the stub, the cam 1479 reverses the mechanism to restore the table to original position.

A two-armed stop member 1480, connected to segments 1466 and 1469, is provided with a flange at the end of each arm thereof, which flanges engage a stud 1481 at the end of each rocking movement of the two-armed stop to provide a positive stop for the table 1200 at each end of its shuttle movements.

The table 1200 is controlled to be shuttled only when a stub 1242 is positioned thereon. The control to obtain this result is effected by the two feelers 1115 and 1315. To obtain the desired results, the feeler 1115 must be released to move its greatest extent, and the feeler 1315 must be arrested by an inserted stub. To this end, the stub 1242 (Fig. 23), when on the table 1200, overlies the feeler 1315 but is out of range of the feeler 1115.

As described above, when the left-hand feeler 1315 is arrested, the yoke 1311 (Figs. 7, 11, 16, and 18) is held stationary, but, if the feeler 1315 is permitted to move its greatest extent, the yoke 1311 is rocked counter-clockwise (Fig. 16). The only time the feeler 1315 is permitted to move its fullest extent is when no statement or no stub is on the table 1243.

The yoke 1311 is provided with a latch 1482, which is moved into engagement with a stud 1483 when the yoke 1311 is rocked. Therefore, when no stub or statement is on the table, the latch 1482 arrests movement of the shuttle mechanism. When a stub is on the table, the feeler 1315, being arrested thereby, causes the latch 1482 to remain in the position shown in Fig. 16, and therefore the hook 1482 does not arrest the shuttle mechanism.

As described hereinbefore, the shaft 1276 is rocked counter-clockwise (Fig. 16) when the right-hand feeler 1115 is permitted to move its fullest extent, which is the case when a stub 1242 is on the table. When a statement is on the table, the feeler 1115 is arrested thereby.

The shaft 1276 has secured thereto a latch 1484, normally engaging the stud 1483 to prevent operation of the shuttle mechanism. When the feeler 1115 operates its fullest extent, the shaft 1276 rocks the latch 1484 out of engagement with the stud 1483, thus permitting the link to be operated under control of the cam 1479.

When no stub or no statement is on the table 1243, both feelers are free to move their fullest extents. Under this condition, the latch 1484 is rocked to release the link 1476, and the latch 1482 is rocked to hold the link 1476, so that the shuttle mechanism does not operate.

*Check endorsing printer*

In the herein-illustrated system, the machine is provided with a printing section in which checks by which bills are paid may be endorsed at the time the statement or stub is receipted, so that the data on each medium will be identical, and thereby disputes can be easily settled when a customer questions the proper credit entered in his account. The data printed with the endorsement is illustrated in Figs. 32 and 33, and, by comparing the data illustrated in Fig. 32 with the data illustrated in Fig. 34, it will be seen that the date, "Dec 17," the machine number, "85," the consecutive number "576," the cashier's initial, "A" and the amount credited to the account, "24.00," are identical. The printing mechanism for endorsing checks is located at the lower right-hand corner of the machine, as viewed in Fig. 1.

In the course of entering transactions in the machine, three conditions involving checks are usually present.

(1) A single statement and a single check are presented.
(2) A plurality of statements and a single check are presented.
(3) A single statement and a plurality of miscellaneous checks are presented.

(1) When a single statement and a single check are present, no key is depressed in the first transaction bank for making the entry. In the operation, an automatic control is effected over the printing mechanism to print the endorsement on the check, provided that the check is inserted into the printer, where a feeler may throw the printing mechanism off, if no check is in position therein.

(2) When a plurality of statements and a single check are presented, the individual statements are entered into the machine by depression of the "List" key 112. When the "List" key is depressed, the printing and endorsing mechanisms are automatically disabled. After all the statements have been "Listed," the single check is inserted into the endorsing printing section, and the "Clear List" key 110 is depressed. This automatically causes the total of the "Listed" items to be printed on the back of the check, and the endorsement is automatically printed therebelow.

(3) When a single statement and a plurality of miscellaneous checks ar presented, the total of the amounts of the checks is first added by depression of the "Add" key 113. During each entry, the check is inserted on the endorsing printer table after the amount thereof has been set up on the keyboard. The ensuing operation causes the data and the amount to be printed thereon and the endorsement to be printed thereon. After all the checks have been added, the statement is placed on the statement table 1243, where the total of the checks is printed thereon.

All of the above results are automatically obtained under the dual control of the keys in the first transaction bank and a check feeler mechanism in the manner described below.

Check endorsing mechanism

The checks are endorsed by an electro in a manner similar to the electro for printing data on the statement, and this is accomplished by feeding the check out of the machine after printing the data entered in the machine.

The check to be endorsed is placed on a table 1700 (Fig. 25), where it lies between feed rollers, above a printing hammer and above a feeler means.

Check feed tension rollers

Shortly after the machine begins its operation, a tension roller 1726 (Figs. 25 and 27) is moved to impinge the check against a feed roller 1727. An opening 1728 in the table 1700 provides access to the check and feed roller 1727 by the tension roller 1726. The tension roller 1726 is mounted on a shaft 1725, carried by a pair of arms 1735 and 1736, rotatably mounted on a shaft 1737. The arm 1735 has an extension, to which a spring 1719 is secured to bias the arms 1735 and 1736 and the tension roller toward the feed roller 1727. The arms 1735 and 1736 are limited in their movements toward the feed roller by a stud 1738 on the arm 1735 engaging an arm 1739 fixed on the shaft 1737. Also fixed on the shaft 1737 is an arm 1740, supporting one end of a link 1741, the other end of the link being pivoted to a cam follower arm 1742, having an anti-friction roller 1743 held in engagement with a cam 1744 by the spring 1719. The cam 1744 is pinned to the printer cam shaft 1273.

After the cam shaft 1273 begins to rotate, the cam 1744, acting through the cam follower arm 1742, the link 1741, and the arm 1740, rocks the shaft 1737 and the arm 1739, to permit the spring 1719 to rock the arms 1735 and 1736 to move the tension roller upwardly to impinge the check on the table 1700 against the feed roller 1727.

Check feed mechanism

After the check has the data, illustrated in the top lines of Figs. 32 and 33, printed thereon, it is fed by rotating the feed roller 1727. The feed roller 1727 is recessed to receive either an electrode 1745 or a porous rubber printing member, described hereinafter (Fig. 27), having thereon type characters for printing an endorsement on the check as it is fed out of the machine. One form of endorsement is illustrated in Figs. 32 and 33.

The feed roller 1727 is rotatably mounted on a shaft 1746 (Figs. 25, 26, and 27) and has connected thereto a pinion 1747. The pinion 1747 meshes with a pinion 1748 on a stud 1749 on a frame 193 and meshes with a gear 1750, rotatable on a stud 1751 on the frame 193 (see also Fig. 31).

Secured to the gear 1750, adjacent the frame 193, is a ratchet wheel 1752, having ratchet teeth engaged by a ratchet pawl 1753 under tension of a spring 1754. The ratchet pawl 1753 is pivoted on an arm 1755, on the stud 1751. A segment 1756, secured to the arm 1755, meshes with teeth of a rack formed on a ling 1757 slidably mounted on two studs 1758 on the frame 193. A spring 1759 biases the link toward the right (Fig. 26), and the link is arrested by a roller 1760 on the free end of a cam follower arm 1761, pivoted on the shaft 1325. The cam follower arm 1761 has an anti-friction roller 1762, held in engagement with a cam 1763 on the printer cam shaft 1273.

After the data illustrated in the upper line of Figs. 31 and 33 has been printed on the check, the cam 1763 rotates to permit the cam follower arm 1761 to rock counter-clockwise (Fig. 26) under tension of spring 1759 to permit link 1759 to move rightwardly. This movement rocks the segment 1756, the arm 1755, and the pawl 1753 counter-clockwise to ratchet the pawl 1753 over the ratchet wheel 1752 far enough to drop into another notch in the disc 1752. Near the end of machine operation, the cam 1763 reverses the movements of these elements to cause the pawl 1753 to rotate the ratchet wheel 1752 and the pinions 1750, 1748, and 1747, thus rotating the feed roller 1726 and its electro 1745 clockwise (Fig. 26) to feed and endorse the check lying on the table 1700. A pawl 1744 locks the ratchet wheel 1752 against retrograde movement.

In the system illustrated herein, it is desired to prevent a feeding operation when no check is on the table and during operations in which the "Clear Add" key 111, the "List" key 112, the "Reset" key 117, or the "Read" key 118 of the first transaction bank is depressed.

A feeler mechanism is provided to disable the feed and endorsing mechanism when no check is on the table, which feeler mechanism includes a feeler 1765 (Figs. 29 and 31). The check is placed between the table 1700 and a backing plate 1766, having openings 1767 and 1768, respectively, through which the feeler may pass. The feeler 1765 is pivote on a bell crank 1769 on the shaft 1770, and the bell crank is guided in its up-and-down movements by the shaft 1737 and a shaft 1771, carried by the frames 180 and 193. A link 1772 connects the bell crank 1769 with an arm 1773 pivoted on the shaft 1325. The arm 1773 has a finger 1774, which is held in engagement with a flange 1775 of a pawl 1776 by a spring 1780, the pawl being pivoted on one arm of a cam follower 1777 pivoted on the shaft 1325. The cam follower arm 1777 has an anti-friction roller 1778, engaging a cam 1779 on the printer cam shaft 1273. When the cam 1779 rotates the follower arm 1777 counter-clockwise (Fig. 29), the arm 1773 will rock therewith under tension of the spring 1780, which urges the finger 1774 against the flange 1775 of the pawl 1776, and at the same time the feeler rises to sense for a check on the table 1700. If a check is present, the feeler 1765 is arrested short of its full extent of movement, whereupon the arm 1773 and the finger 1774 are arrested, but the follower arm 1777 continues to move under the urgency of a spring 1781 connected thereto and as controlled by the cam 1779. During this movement, the flange 1775 slides on the outer periphery of the arm 1773. Upon further rotation of the cam 1779, the follower arm 1777 is returned to normal position, and the pawl 1776 returns the arm 1773 and the feeler 1765 to normal position.

When no check is on the table 1700, the feeler 1765 passes through both openings 1767 and 1768, thus permitting the feeler 1765 and the connections to arm 1773 to move the latter its greatest extent when the cam 1779 permits the follower arm 1777 and the pawl 1776 to move.

When the pawl 1776 is moved its fullest extent, the flange 1775 drops behind a segment 1782, pivoted on the shaft 1325. A notch 1783 in the periphery of the arm 1773 permits this dropping movement of the pawl. Thereafter, when the follower arm 1777 is returned to normal, the flange 1775, engaging the segment 1782, rocks the segment clockwise (Fig. 29). The segment 1777 is bifurcated to engage a stud 1784 of an arm 1785 pinned to a shaft 1786, and, through the stud 1784, the segment 1777 rocks the shaft 1786 counter-clockwise (Figs. 26 and 29).

Secured to the shaft 1786 is an arm 1787, which, when the shaft 1786 is rocked, moves behind a stud 1788 on the link 1757 to disable the cocking movement of the link and the feeding mechanism.

Therefore, when no check is on the table 1700, and the feeler moves its greatest extent, the arm 1787 is moved into the path of the stud 1788 to disable the feeding and endorsing mechanism.

As before pointed out, it is also desirable to disable the check feeding and endorsing mechanism when a key 111, 112, 117, or 118 of the first transaction bank is depressed. To provide a disabling means controlled from the first transaction bank, a notched disk 1790 is provided for controlling a disabling of the feeding link 1757. The notched disk 1790 is differentially positioned by the differential mechanism of the first transaction bank through the series of internal pinions and teeth of the disk in the same manner described for other notched discs herein, and as fully described in the Goodbar et al. Patent No. 2,616,623.

To disable the feeding and endorsing mechanism, a notch 1791 in the disc 1790 is positioned into the path of a feeler 1792 when the machine is operated with any one of said keys 111, 112, 117, or 118 depressed. The feeler 1792 is released for operation when the shaft 1290 is rocked in the manner described hereinbefore. An arm 1793 on the shaft 1290 normally maintains a stud 1794 on an arm 1795 in the position shown in Fig. 26, wherein the feeler 1792, connected to the arm 1795, is restrained under tension of a spring 1796. The feeler is guided in its movements on a stud 1797. The link 1798 connects the arm 1795 to a disabling arm 1799, pivoted on the shaft 1786.

When the shaft 1290 is rocked, the spring 1796 moves the feeler into a notch 1791, and simultaneously it moves the disabling arm 1799 into the path of movement of the stud 1788, thus preventing movement of the link 1757, and causes the disabling of the check feeding and endorsing means.

When the machine is operated with no key depressed in the first transaction bank, or with the key 110 or 113 depressed, the outer periphery of the disc 1790 is moved into the path of the feeler 1792, which prevents movement thereof and thereby prevents movement of the disabling arm 1799 into the path of movement of the stud 1788; therefore the feeding link 1757 is free to operate.

*Check printing mechanism*

The check printing mechanism is similar to the printing mechanism for the statement, shown in Fig. 10, and comprises a printing platen 1800 (Figs. 25, 27, and 31) having on each end thereof a stud 1801 projecting into notches in arms 1802 secured to the shaft 1771. One of the arms 1802 is provided with a downwardly-projecting ear, to which is pivoted one end of a link 1804. The other end of the link 1804 is pivoted on a stud 1806, carried by an arm 1807, pivoted on a stud 1808, carried by the side frame 180. The arm 1807 is provided with a toe engaging a stud 1809 on the side frame 180 to limit the clockwise rotation of the arm 1807. Also pivoted on the stud 1806 is one link 1810 of a toggle including a second link 1811, the links 1810 and 1811 being connected by a stud 1812. The link 1811 is also pivoted on a stud 1813, carried by a bell crank 1814, pivoted on a stud 1815, carried by the side frame 180. The bell crank 1814 is provided with a toe normally engaging a stud 1816 carried by the side frame 180, to limit its counter-clockwise rotation. The stud 1812 projects into the bifurcated end of a cam follower arm 1817, pivotally mounted on the beforementioned shaft 1325. The cam follower arm 1817 is provided with rollers 1818, which engage cam plates 1819 carried by the printer cam shaft 1273.

The bell crank 1814 is provided with a stud 1820, which projects into the path of movement of a control segment 1821, pivoted on the shaft 1786. In order to control the operation of the printing platen 1800, the segment 1821 may be rocked counter-clockwise beneath the stud 1820 to prevent clockwise rotation of the bell crank 1814 when the cam plates 1819 are rotated to rock the cam follower arm 1817. When the cam plates 1819 rock the cam follower arm 1817 clockwise, its bifurcated end, engaging the stud 1812, raises the stud to straighten the toggle consisting of the links 1810 and 1811. If the segment 1821 is beneath the stud 1820, the bell crank 1814 cannot move clockwise, and therefore the toggle, comprising the links 1810 and 1811, is straightened to rock the arm 1807 counter-clockwise. Counter-clockwise movement of the arm 1807, through the stud 1806, shifts the link 1804 toward the left (Fig. 28) to rock the shaft 1771 and the arms 1802 clockwise to raise the platen 1800 into engagement with the type carriers on the shaft 463.

If the segment 1821 is not moved beneath the stud then, when the cams 1819 rock the cam follower arm 1817 clockwise, the bell crank 1814 is not arrested, and therefore the bell crank 1814 is free to rock clockwise when the toggle comprising the links 1810 and 1811 is straightened. In this operation, the arm 1807 is not rocked counter-clockwise, and therefore the platen 1800 is not raised to take an impression on the issuing strip.

The positioning of the control segment 1821 is controlled by a notched disc 1831 (Fig. 25). The notched disc 1831 is differentially positioned under control of the keys in the first transaction bank in the manner described in United States Patent No. 2,616,623, through the square shaft 743. The square shaft 743 is provided with a pinion 1832, meshing with internal teeth on the disc 1831. The notched disc 1831 is provided with internal teeth which ride on a disc 1833, carried by the shaft 632.

The control segment 1821 is connected to a bell crank 1840 by a link 1839. The bell crank 1840 is pivotally mounted on the beforementioned shaft 1290 and is provided with a stud 1845 normally resting on an arm 1842 secured to the beforementioned shaft 1290. One arm of the bell crank 1840 has pivoted thereto a feeler link 1841, slotted near its free end to slide on a stud 1837, carried by the side frame 180. A spring 1843 normally maintains the stud 1845 in engagement with the arm 1842. The forward end of the feeler link 1841 is provided with a feeler finger 1846, which coacts with the control disc 1831.

If the feeler finger 1846 engages a low spot in the disc 1831, the link 1841, when moved by the spring 1843, moves toward the left (Fig. 25), thus rocking the bell crank 1840 clockwise to lower the link 1839 and position the segment 1821 into the path of the stud 1820. When this condition occurs, the toggle comprising the links 1810 and 1811 is straightened, and the arm 1807 is rocked counter-clockwise to cause an impression to be taken in the manner described hereinbefore. However, if the finger 1846 engages a high spot (or, in other words, the periphery of the disc 1831), the feeler link 1841 is not permitted to move, and therefore the control segment 1821 is held out of the path of the stud 1820. Therefore no impression will be taken.

The control disc 1831 is notched, so as to move a notch into the path of the finger 1846 only when the "Clear List" key 110, the "Clear Add" key 111, the "Add" key 114, the "Reset" key 117, the "Read" key 118, or no key at all is depressed in the first transaction bank. When the "List" key 112 is depressed, a high spot is moved into the path of the finger 1846. Thus the control disc 1831 is illustrated herein to throw off the printing mechanism only when the "List" key 112 is depressed.

The above notchings of the control disc 1831 are shown by way of example only, for use in connection with the business system illustrated, but, if the machine is used for other purposes, the notching of the control disc may be altered according to the requirements of the system in which the machine is being used.

Check printing—Feeler control

Means under control of the feeler 1765 overrides the control of the printing mechanism by the notched control disc 1831 when no check is on the table 1700. As pointed out above, when no check is on the table, the feeler 1765 rises its greatest extent and, in so doing, rocks the shaft 1786 counter-clockwise (Figs. 29 and 30).

Secured to the shaft 1786 is a stop arm 1850, which lies adjacent the segment 1821 and is moved beneath a flange 1851 on the link 1839 when the shaft 1786 is rocked in said manner. This prevents lowering of the link 1839 and thereby prevents segment 1821 from moving beneath the stud 1820, to prevent operation of the printing platen, in the manner described hereinbefore.

Audit tape

An audit tape like that shown in the above-mentioned patent is provided in the machine, and it is located between the statement printing and the check endorsing mechanisms and is indicated generally by the reference numeral 1852 in Fig. 1. For detailed description of this mechanism, reference may be had to the said patent.

Ribbon mechanism

An ink ribbon is provided to enable the printing platen to make legible records on the statements, the checks, and the audit tape. The ribbon mechanism is substantially like that shown in the above-mentioned patent.

OPERATION

In order to explain the various types of operations and entries which can be made in the machine, a brief outline of the entry of typical types of transactions will now be explained.

Transactions involving a stub and one check

Normally, when a customer pays a bill, he mails to the store a stub taken from his statement, together with a check to cover the amount of the statement. In the entry of this type of transaction, the stub is placed on the left-hand table under the clip 1202, and the amount of the check (such as $35.00, illustrated in Fig. 33) is set up on the amount keyboard. Next, the check is placed on the right-hand table 1700, and the machine is released by depression of the cashier's key A or B.

At the beginning of machine operation, the right-hand feeler in the statement printer is free to rise its greatest extent, due to the fact that the statement is not overlying this feeler. However, the left-hand feeler is arrested by the inserted statement. Under these conditions, the two feelers set various controls in the printer to first cause the table 1200 to shuttle the statement stub into printing position, and the printing mechanism is controlled to make one impression on the stub. Also, the feeding mechanism in the statement printer is disabled, so that no feeding operation will take place. After the printing has been effected on the stub, the table 1200 is again shuttled back to its original position, where the stub can be removed therefrom. In the check printing mechanism, the data set up on the keyboard is printed on the back of the check, and the check is thereafter fed out of the machine, during which feeding operation the endorsement illustrated in Fig. 33 is printed thereon. After the machine comes to rest, the amount received, as represented by the check, is printed on the stub, and also the check is endorsed, ready for deposit.

As illustrated in Figs. 33 and 35, other data, in addition to the amount paid, is printed on the check and on the stub, so that the transaction can be identified in the event of a dispute as to the amount actually paid.

Transactions involving a stub and more than one check

When a customer mails the stub taken from his statement, together with more than one check, the first step in entering the transaction is to add the total amount of the checks submitted. In doing so, the checks are placed on the check printing table 1700 after the amount has been set up on the keyboard, with or without positioning the statement stub on the table beneath the clip 1202. To add the value of the checks, the Add key 112 is first depressed, and then the machine is released by depression of a cashier's key. During this operation, the Add key disables the printing mechanism in the statement printer, the feeler in the check endorsing printer causes the amount of the check to be endorsed on its back, and, as the check is fed out of the machine, the endorsement is printed thereon. The amount is added on the upper, or visible, totalizer. Each check is successively entered in the same manner. After all the checks have been entered, the total thereof is read from the visible totalizer, and this totalizer is cleared by first depressing the Clear Add key and thereafter releasing the machine by depression of the cashier's key. Thereafter the amount taken from the visible totalizer is set up on the keyboard, and, with the statement stub in position beneath the clip 1202, the machine is released by depression of a cashier's key. At the beginning of the machine operation, the right-hand feeler in the statement printer is permitted to rise its greatest extent, and the left-hand feeler is arrested by the statement stub, with the result that one impression is made on the stub, and the feeding mechanism is disabled.

Depression of the Add key disables the consecutive numbering mechanism, so that each of the checks added onto the visible totalizer is given the same serial number which is later printed on the statement stub. In this manner, the miscellaneous checks which have been added and endorsed are identified with the entry made on the stub, so that any dispute arising between the customer and the store can be resolved by a comparison of the endorsements on the check with the amount credited on the stub.

Transactions involving a plurality of stubs and one check

When a customer mails in a plurality of statement stubs which are covered by a single check, the stubs are first positioned on the table under the clip 1202, one at a time; the amount of each statement stub is set up on the keyboard; and the List key is depressed, followed by the depression of a cashier's key, which releases the machine for operation. During the machine operation, the feelers in the statement printer control the printing mechanism to cause an impression to be made on the stub, after the stub has been shuttled into printing position. After all of the stubs have been printed upon, the total is read from the visible totalizer, and the visible totalizer is cleared by depression of the Clear List key, releasing the machine for operation. Thereafter, the amount of the plurality of stubs is set up on the keyboard, the check is placed on the check table 1700, and the machine is released for operation, during which operation the total amount credited to the customer is endorsed on the back of the check and the usual endorsement, illustrated in Fig. 33, is printed thereon as the check is fed out of the machine. The consecutive numbering device is disabled by the List key during the operations in which the stubs are listed, and therefore all of the stubs will have the same number thereon, which number will be the same as the one endorsed on the back of the check, so that any dispute arising between the customer and the store can be checked by a comparison of the consecutive numbering of the stubs with the consecutive number on the endorsed check.

*Transactions involving a plurality of stubs and a plurality of checks*

If a customer presents a plurality of stubs and a plurality of checks for payment, which checks do not necessarily individually agree with the individual amounts of the statements, the statements are endorsed by use of the List key in the manner set forth above, and the amounts of the checks may be added by use of the Add key in the manner described above. Inasmuch as both the List key and the Add key disable the consecutive numbering mechanism, the data printed on the stubs and endorsed on the checks will all agree, thus tying up the complete transaction by use of the same identification number, which provides a means for settling any disputes which may arise between the customer and the store.

*Transactions involving complete statements*

When the complete statement is presented for payment, as when the person presents the statement at the cashier's window, the operations are all identical, as described above, with those for entering transactions involving only the stub. The complete statement is positioned on the table near its right-hand edge, in which case both the right-hand and the left-hand feelers are prevented from rising their fullest extent. Therefore the printing mechanism is controlled for making two impressions, one on the stub and one on the main portion of the statement, and the feeding mechanism for the statement is rendered effective, so that, after the amounts have been printed on the stub and on the main part of the statement, the statement is fed out of the machine, at which time the electro mechanism, operated simultaneously with the feeding mechanism, endorses the word "Paid" and any other data that may be desired, such as "Thank you. We appreciate your patronage," illustrated in Fig. 34.

In making entries involving a plurality of checks or a plurality of statements, the procedure followed is the same as when a stub is presented; that is, the Add key in the first transaction bank is used for totaling the number of checks, and the List key is used to total the amounts of the statements. In each case, the consecutive number printed identifies the check or checks which were presented for payment.

While the form of mechanism shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. In a machine of the class described, the combination of two slip feelers; recording means to record data on a plurality of different size forms, said slip feelers adapted to sense the forms whereby the extent of movement of said feelers is controlled; and means settable under control of the two slip feelers when arrested by the form to control the recording means to operate two times during a single machine operation, said last-named means settable under control of one slip feeler when arrested by a form to control the recording means to operate one time, depending upon the size form being sensed by the slip feelers.

2. In a machine of the class described, the combination of a pair of slip feelers; a pair of recording means to record data on different size forms, said slip feelers adapted to sense the presence or absence of forms in the machine whereby the extent of movement of said slip feelers is controlled; and means under control of the slip feelers to control the recording means to operate once during a machine operation when only one slip feeler senses the presence of one size form in the machine, and to operate two times when the pair of slip feelers sense the presence of another size form in the machine.

3. In a machine of the class described, the combination of a plurality of slip feelers; recording means to record data on a plurality of different size forms, said slip feelers adapted to sense the presence or absence of forms in the machine whereby the extent of movement of said slip feelers is controlled; and means under control of the slip feelers to control the recording means to operate once during a machine operation when only one slip feeler senses the presence of one size form in the machine, and to operate two times when the plurality of slip feelers sense the presence of another size form in the machine, and to disable the recording means when none of the feelers sense the presence of a form of either size in the machine.

4. In a machine of the class described, the combination of recording means for entering data on record material; a settable device to control the operation of the recording means; a mechanism for normally moving the settable device from an ineffective position into an effective position to cause the recording device to operate two times; a plurality of feelers; a first stop means operable under control of one of said feelers to arrest operation of said mechanism to maintain the settable device in ineffective position to disable operation of the recording means; a second stop means operable under control of another one of the feelers to arrest the operation of said mechanism short of fully operated position to move the settable device into effective position; and means to restore the said mechanism from said short position and thereby restore the settable device to normal position after one recording operation.

5. In a machine of the class described, the combination of recording means for entering data on record material; a settable device to control the operation of the recording means; a mechanism for normally moving the settable device from an ineffective position into an effective position to cause the recording device to operate two times; a plurality of feelers; a first stop means operable under control of one of said feelers to arrest operation of said mechanism to maintain the settable device in ineffective position to disable operation of the recording means; a second stop means operable under control of another one of the feelers to arrest the operation of said mechanism short of fully operated position to move the settable device into effective position; and means rendered effective when said mechanism is arrested short of fully operated position to restore the settable device to normal position immediately after the recording means has been operated once to thereby prevent a second operation of the recording means.

6. In a machine of the class described, the combination of recording means for entering data on record material; a settable device to control the operation of the recording means; a mechanism for normally moving the settable device from an ineffective position into an effective position to cause the recording device to operate two times; a plurality of feelers; a first stop means operable under control of one of said feelers to arrest operation of said mechanism to maintain the settable device in ineffective position to disable operation of the recording means; a second stop means operable under control of another one of the feelers to arrest the operation of said mechanism short of fully operated position to move the settable device into effective position; an operating means to restore said mechanism to original position after two recording operations have been completed; a second operating means to restore said mechanism to original position from said short position; and a coupling pawl to automatically couple said mechanism to the second operating means when said mechanism is in said short position, said second operating means operable to restore said mechanism after the first recording operation to thereby withdraw the settable device after said first recording operation to prevent a second operation of the recording means.

7. In a machine of the class described, the combination of recording means for entering data on record material; a settable device to control the operation of the recording means; a mechanism for normally moving the settable device from an ineffective position into an effective position to cause the recording device to operate two times; a plurality of feelers; a first stop means operable under control of one of said feelers to arrest operation of said mechanism to maintain the settable device in ineffective position to disable operation of the recording means; a second stop means operable under control of another one of the feelers to arrest the operation of said mechanism short of fully operated position to move the settable device into effective position; an operating means to restore said mechanism to original position after two recording operations have been completed; a second operating means to restore said mechanism to original position from said short position; a coupling pawl to automatically couple said mechanism to the second operating means when said mechanism is in said short position, said second operating means operable to restore said mechanism after the first recording operation to thereby withdraw the settable device after said first recording operation to prevent a second operation of the recording means; and a differentially settable control disc to selectively disable the operation of said mechanism.

8. In a machine of the class described, the combination of recording means for entering data on record material; a settable device to control the operation of the recording means; a mechanism for normally moving the settable device from an ineffective position into an effective position to cause the recording device to operate two times; a plurality of feelers; a first stop means operable under control of one of said feelers to arrest operation of said mechanism to maintain the settable device in ineffective position to disable operation of the recording means; a second stop means operable under control of another one of the feelers to arrest the operation of said mechanism short of fully operated position to move the settable device into effective position; an operating means to restore said mechanism to original position after two recording operations have been completed; a second operating means to restore said mechanism to original position from said short position; a coupling pawl to automatically couple said mechanism to the second operating means when said mechanism is in said short position, said second operating means operable to restore said mechanism after the first recording operation to thereby withdraw the settable device after said first recording operation to prevent a second operation of the recording means; a plurality of manipulative devices; and a differentially settable control member, settable under control of said manipulative devices to selectively disable the operation of said mechanism.

9. In a machine of the class described, the combination of recording means for entering data on record material; a settable device to control the operation of the recording means; a mechanism for normally moving the settable device from an ineffective position into an effective position to cause the recording device to operate two times; a plurality of feelers; a first stop means operable under control of one of said feelers to arrest operation of said mechanism to maintain the settable device in ineffective position to disable operation of the recording means; a second stop means operable under control of another one of the feelers to arrest the operation of said mechanism short of fully operated position to move the settable device into effective position; an operating means to restore said mechanism to original position after two recording operations have been completed; a second operating means to restore said mechanism to original position from said short position; a coupling pawl to automatically couple said mechanism to the second operating means when said mechanism is in said short position, said second operating means operable to restore said mechanism after the first recording operation to thereby withdraw the settable device after said first recording operation to prevent a second operation of the recording means; a plurality of manipulative devices; a control disc differentially settable under control of said manipulative devices; and a sensing device controlled by the control disc to selectively disable the operation of said mechanism.

10. In a machine of the class described, the combination of recording means for entering data on record material; a settable device to control the operation of the recording means; a mechanism for normally moving the settable device from an ineffective position into an effective position to cause the recording device to operate two times; a plurality of feelers; a first stop means operable under control of one of said feelers to arrest operation of said mechanism to maintain the settable device in ineffective position to disable operation of the recording means; a second stop means operable under control of another one of the feelers to arrest the operation of said mechanism short of fully operated position to move the settable device into effective position; an operating means to restore said mechanism and settable device from said effective position to original positions after the recording means has operated two times; a second operating means to restore said mechanism and settable device from said effective position to original positions after the recording means has operated one time; a coupling pawl carried by one element of said mechanism for coupling the said mechanism to said second operating means; and means on the coupling pawl engageable with one element of said first operating means to maintain the coupling pawl out of engagement with the second operating means, said pawl movable into engagement with the second operating means when the said mechanism is arrested in said short position whereby the second operating means restores the said mechanism to original position immediately after the first recording operation of the recording means.

11. In a machine of the class described, recording means for recording data on record material inserted into the machine, said record material comprising material of different sizes; two record material feelers located in respect to the inserted record materials so that one feeler senses either size record material, and the other feeler senses only the larger size record material; and means settable by the joint control of the feelers, as controlled by the extent of movement thereof by the record material, to control the operation of the recording means to operate one time when one feeler senses record material and to operate two times when both feelers sense record material.

12. In a machine of the class described, recording means for recording data on record material inserted into the machine, said record material comprising material of different sizes; locating means to position the record materials in the machine; two record material feelers located in respect to the inserted record materials so that one feeler senses either size record material, and the other feeler senses only the larger size record material; and means settable by the joint control of the feelers, as controlled by the extent of movement thereof by the record material, to control the operation of the recording means to operate one time when one feeler senses record material and to operate two times when both feelers sense record material.

13. In a machine of the class described, recording means for recording data on record material inserted into the machine, said record material comprising material of different sizes; locating means to position the record materials in the machine; two record material feelers located in respect to the inserted record materials so that one feeler senses either size record material, and the other feeler senses only the larger size record material; means set under control of one feeler to cause two operations of the recording means; and means set under control of the other feeler when said other feeler is not arrested by record material to modify the operation of the recording means to prevent the second operation of the recording means.

14. In a machine of the class described, the combination of a movable table for supporting record material; recording means for recording data on the record material; said movable table normally in position to support the record material out of recording position in respect to the recording means; a first feeler to sense the presence of record material on the table; a stationary table to support record material in recording position in respect to the recording means; a second feeler to sense the presence of record material on the stationary table; a moving mechanism to move the table into recording position; latching means normally latching the moving mechanism against operation; means actuated by the second feeler when no record material is on the stationary table to withdraw the latching means to thereby release the moving mechanism; a second latch normally out of latching position; and means actuated by the first feeler to move the second latch into latching position when no record material is sensed on the movable table, said last-named means maintaining the second latch in normal position when record material is sensed on the movable table to enable the moving mechanism to move the table and the record material thereon into recording position.

15. In a machine of the class described, the combination of a movable table for supporting record material; recording means for recording data on the record material; said movable table normally in position to support the record material out of recording position in respect to the recording means; a first feeler to sense the presence of record material on the table; a stationary table to support record material in recording position in respect to the recording means; a second feeler to sense the presence of record material on the stationary table; a moving mechanism to move the table into recording position; two latching means, one normally latching the moving mechanism against movement and the other normally in unlatching position in respect to the moving means; and means operated under control of the feelers to actuate the two latching means to unlatch the moving mechanism when record material is on the movable table and to latch the moving mechanism when record material is on the stationary table.

16. In a machine of the class described, the combination of a movable table for supporting record material; recording means for recording data on the record material; said movable table normally in position to support the record material out of recording position in respect to the recording means; a first feeler to sense the presence of record material on the table; a stationary table to support record material in recording position in respect to the recording means; a second feeler to sense the presence of record material on the stationary table; a moving mechanism to move the table into recording position; two latching means, one normally latching the moving mechanism against movement and the other normally in unlatching position in respect to the moving means; and means operated under control of the feelers to actuate the two latching means to unlatch the moving mechanism when record material is on the movable table and to latch the moving mechanism when record material is on the stationary table, said latches controlled by both feelers to latch the moving means when no record material is on either table.

17. In a machine of the class described, the combination of a movable table for supporting record material; recording means for recording data on the record material, said movable table normally in position to support the record material out of recording position in respect to the recording means; a first feeler to sense the presence of record material on the table; a stationary table to support record material in recording position in respect to the recording means; a second feeler to sense the presence of record material on the stationary table; a moving mechanism to move the table into recording position; two latching means, one normally latching the moving mechanism against movement and the other normally in unlatching position in respect to the moving means; and means operated under control of the feelers to actuate the two latching means to unlatch the moving mechanism when record material is on the movable table and to latch the moving mechanism when record material is on the stationary table, said one latching means movable out of latching position, and said other latching means movable into latching position when no record material is sensed on either table.

18. In a machine of the class described, the combination of a movable table for supporting record material; recording means for recording data on the record material, said movable table normally in position to support the record material out of recording position in respect to the recording means; a first feeler to sense the presence of record material on the table; a stationary table to support record material in recording position in respect to the recording means; a second feeler to sense the presence of record material on the stationary table; a moving mechanism to move the table into recording position; two latching means, one normally latching the moving mechanism against movement and the other normally in unlatching position in respect to the moving means; and means operated under control of the feelers to actuate the two latching means to unlatch the moving mechanism when record material is on the movable table and to latch the moving mechanism when record material is on the stationary table, said one latching means movable out of latching position under control of said first feeler, and said other latching means movable into latching position under control of said second feeler, said latching means thus controlled when no record material is sensed by the feelers on either table.

19. In a machine of the class described, the combination of a movable table for supporting record material; recording means for recording data on the record material, said movable table normally in position to support the record material out of recording position in respect to the recording means; a first feeler to sense the presence of record material on the table; a stationary table to support record material in recording position in respect to the recording means; a second feeler to sense the presence of record material on the stationary table; a moving mechanism to move the table into recording position; latching means normally latching the moving mechanism against operation; means actuated by the second feeler when no record material is on the stationary table to withdraw the latching means to thereby release the moving mechanism; a second latch normally out of latching position; means actuated by the first feeler to move the second latch into latching position when no record material is sensed on the movable table, said last-named means maintaining the second latch in normal position when record material is sensed on the movable table to enable the moving mechanism to move the table and the record material thereon into recording position; a differentially settable control disc; a plurality of manipulative devices to control the differential setting of the control disc; sensing means to sense the control disc; and means settable under control of the sensing means to disable the moving means irrespective of the presence or absence of record material on either table.

20. In a machine of the class described, the combination of a movable table for supporting record material; recording means for recording data on the record material, said movable table normally in position to support the record material out of recording position in respect to the recording means; a first feeler to sense the presence of record material on the table; a stationary table to support record material in recording position in respect to the recording means; a second feeler to sense the presence of record material on the stationary table; a moving mechanism to move the table into recording position; latching means normally latching the moving mechanism against operation; means actuated by the second feeler when no record material is on the stationary table to withdraw the latching means to thereby release the moving mechanism; a second latch normally out of latching position; means actuated by the first feeler to move the second latch into latching position when no record material is sensed on the movable table, said last-named means maintaining the second latch in normal position when record material is sensed on the movable table to enable the moving mechanism to move the table and the record material thereon into recording position; a differentially settable control disc; a plurality of manipulative devices to control the differential setting of the control disc; sensing means to sense the control disc; and means settable under control of the sensing means to override the control over the moving means by said latching means.

21. In a machine of the class described, the combination of a movable table for supporting record material; recording means for recording data on the record material, said movable table normally in position to support the record material out of recording position in respect to the recording means; a first feeler to sense the presence of record material on the table; a stationary table to support record material in recording position in respect to the recording means; a second feeler to sense the presence of record material on the stationary table; a moving mechanism to move the table into recording position; latching means normally latching the moving mechanism against operation; means actuated by the second feeler when no record material is on the stationary table to withdraw the latching means to thereby release the moving mechanism; a second latch normally out of latching position; means actuated by the first feeler to move the second latch into latching position when no record material is sensed on the movable table, said last-named means maintaining the second latch in normal position when record material is sensed on the movable table to enable the moving mechanism to move the table and the record material thereon into recording position; a differentially settable control disc; a plurality of manipulative devices to control the differential setting of the control disc; sensing means to sense the control disc; and means settable by the sensing means to control the positioning of the latching means to thereby control the operation of the moving means under control of the manipulative devices irrespective of the operation of the feelers.

22. In a machine of the class described, recording means; a table to support record material in relation to the recording means whereby data is entered on the record material; operating means for the recording means, said operating means operable to enter the data on record material one or two times; feeler mechanism; means to actuate the feeler mechanism to sense the record material on the table; feeding means to feed the record material after the data has been entered on the record material the first time, to space the first recorded data from the second recorded data on the record material; and devices settable by the means to actuate the feeler means to control the operation of the recording means to make one or two data recordings and to simultaneously control the feeding means to operate when the recording means is operated to make two recordings and to disable the feeding means when the recording means is operated to make only one recording.

23. In a machine of the class described, the combination of a plurality of slip feelers; recording means to record data on a plurality of different size forms, said slip feelers adapted to sense the forms whereby the extent of movement of said feelers is controlled; feeding means to line-space one of said size forms; and means settable under control of the slip feelers to control the recording means to operate one or two times during a single operation of the machine, and simultaneously control the feeding means to line-space the said one size forms during machine operations in which the recording means is operated two times, said settable means being set under control of the feelers according to the size form being sensed by the feelers.

24. In a machine of the class described, the combination of a plurality of slip feelers; recording means to record data on a plurality of different size forms, said slip feelers adapted to sense the presence or absence of forms in the machine whereby the extent of movement of said slip feelers is controlled; feeding means to line-space one size form; a first means under control of the slip feelers to control the recording means to operate once during a machine operation when only one slip feeler senses the presence of a form in the machine, and to operate two times when the plurality of slip feelers sense the presence of a form in the machine; and a second means under control of the slip feelers to control the feeding means to line-space the form when the plurality of slip feelers sense the presence of a form in the machine.

25. In a machine of the class described, the combination of a plurality of slip feelers; recording means to record data on a plurality of different size forms, said slip feelers adapted to sense the presence or absence of forms in the machine whereby the extent of movement of said slip feelers is controlled; feeding means to line-space one size form; a first means under control of the slip feelers to control the recording means to operate once during a machine operation when only one slip feeler senses the presence of a form in the machine, and to operate two times when the plurality of slip feelers sense the presence of a form in the machine; and a second means under control of the slip feelers to control the feeding means to line-space the form when the plurality of slip feelers sense the presence of a form in the machine, said first and second means settable under control of the feelers to disable the recording means and the feeding means when none of the feelers sense the presence of a form in the machine.

26. In a machine of the class described, the combination of recording means for entering data on record material; a settable device to control the operation of the recording means, a mechanism for normally moving the settable device from an ineffective position into an effective position to cause the recording device to operate two times; a plurality of feelers; a first stop means operable under control of one of said feelers to arrest operation of said mechanism to maintain the settable device in ineffective position to disable operation of the recording means; a second stop means operable under control of another one of the feelers to arrest the operation of said mechanism short of fully operated position to move the settable device into effective position; means to restore the said mechanism from said short position and thereby restore the settable device to normal position after one recording operation; feeding means to feed the record material after the first record has been entered on the record material; and a third stop means connected to the said second stop means, said third stop means movable into a position to disable the feeding mechanism when the second stop means is moved into position to arrest the settable device in said short position.

27. In a machine of the class described, the combination of recording means for entering data on record material; a settable device to control the operation of the recording means; a mechanism for normally moving the settable device from an ineffective position into an effective position to cause the recording device to operate two times; a plurality of feelers; a first stop means operable under control of one of said feelers to arrest operation of said mechanism to maintain the settable device in ineffective position to disable operation of the recording means; a second stop means operable under control of another one of the feelers to arrest the operation of said mechanism short of fully operated position to move the settable device into effective position; feeding means to feed the record material after the first record has been entered on the record material; a third stop means connected to the second stop means movable into a position to disable the feeding means when the second stop means is moved into said short position; and means rendered effective when said mechanism is arrested short of fully operated position to restore the settable device to normal position immediately after the recording means has been operated once to thereby prevent a second operation of the recording means.

28. In a machine of the class described, the combination of recording means for entering data on record material; a settable device to control the operation of the recording means; a mechanism for normally moving the settable device from an ineffective position into an effective position to cause the recording device to operate two times; a plurality of feelers; a first stop means operable under control of one of said feelers to arrest operation of said mechanism to maintain the settable device in ineffective position to disable operation of the recording means; a second stop means operable under control of another one of the feelers to arrest the operation of said mechanism short of fully operated position to move the settable device into effective position; feeding means to feed the record material after the first record has been entered on the record material; a third stop means connected to the second stop means movable into a position to disable the feeding means when the second stop means is moved into said short position; means rendered effective when said mechanism is arrested short of fully operated position to restore the settable device to normal position immediately after the recording means has been operated once to thereby prevent a second operation of the recording means; an operating means to restore said mechanism to original position after two recording operations have been completed; a second operating means to restore said mechanism to original position from said short position; and a coupling pawl to automatically couple said mechanism to the second operating means when said mechanism is in said short position, said second operating means operable to restore said mechanism after the first recording operation to thereby withdraw the settable device after said first recording operation to prevent a second operation of the recording means.

29. In a machine of the class described, the combination of recording means for entering data on record material; a settable device to control the operation of the recording means; a mechanism for normally moving the settable device from an ineffective position into an effective position to cause the recording device to operate two times; a plurality of feelers; a first stop means operable under control of one of said feelers to arrest operation of said mechanism to maintain the settable device in ineffective position to disable operation of the recording means; a second stop means operable under control of another one of the feelers to arrest the operation of said mechanism short of fully operated position to move the settable device into effective position; feeding means to feed the record material after the first record has been entered on the record material; a third stop means connected to the second stop means movable into a position to disable the feeding means when the second stop means is moved into said short position; means rendered effective when said mechanism is arrested short of fully operated position to restore the settable device to normal position immediately after the recording means has been operated once to thereby prevent a second operation of the recording means; an operating means to restore said mechanism to original position after two recording operations have been completed; a second operating means to restore said mechanism to original position from said short position; a coupling pawl to automatically couple said mechanism to the second operating means when said mechanism is in said short position, said second operating means operable to restore said mechanism after the first recording operation to thereby withdraw the settable device after said first recording operation to prevent a second operation of the recording means; and a differentially settable control disc to selectively disable the operation of said mechanism.

30. In a machine of the class described, the combination of recording means for entering data on record material; a settable device to control the operation of the recording means; a mechanism for normally moving the settable device from an ineffective position into an effective position to cause the recording device to operate two times; a plurality of feelers; a first stop means operable under control of one of said feelers to arrest operation of said mechanism to maintain the settable device in ineffective position to disable operation of the recording means; a second stop means operable under control of another one of the feelers to arrest the operation of said mechanism short of fully operated position to move the settable device into effective position; feeding means to feed the record material after the first record has been entered on the record material; a third stop means connected to the second stop means movable into a position to disable the feeding means when the second stop means is moved into said short position; means rendered effective when said mechanism is arrested short of fully operated position to restore the settable device to normal position immediately after the recording means has been operated once to thereby prevent a second operation of the recording means; an operating means to restore said mechanism to original position after two recording operations have been completed; a second operating means to restore said mechanism to original position from said short position; a coupling pawl to automatically couple said mechanism to the second operating means when said mechanism is in said short position, said second operating means operable to restore said mechanism after the first recording operation to thereby withdraw the settable device after said first recording operation to prevent a second operation of the recording means; a plurality of manipulative devices; and a differentially settable control member settable under control of said manipulative devices to selectively disable the operation of said mechanism.

31. In a machine of the class described, the combination of recording means for entering data on record material; a settable device to control the operation of the recording means; a mechanism for normally moving the settable device from an ineffective position into an effective position to cause the recording device to operate two times; a plurality of feelers; a first stop means operable under control of one of said feelers to arrest operation of said mechanism to maintain the settable device in ineffective position to disable operation of the recording means; a second stop means operable under control of another one of the feelers to arrest the operation of said mechanism short of fully operated position to move the settable device into effective position; feeding means to feed the record material after the first record has been entered on the record material; a third stop means connected to the second stop means movable into a position to disable the feeding means when the second stop means is moved into said short position; means rendered effective when said mechanism is arrested short of fully operated position to restore the settable device to normal position immediately after the recording means has been operated once to thereby prevent a second operation of the recording means; an operating means to restore said mechanism to original position after two recording operations have been completed; a second operating means to restore said mechanism to original position from said short position; a coupling pawl to automatically couple said mechanism to the second operating means when said mechanism is in said short position, said second operating means operable to restore said mechanism after the first recording operation to thereby withdraw the settable device after said first recording operation to prevent a second operation of the recording means; a plurality of manipulative devices; a control disc differentially settable under control of said manipulative devices; and a sensing device controlled by the control disc to selectively disable the operation of said mechanism.

References Cited in the file of this patent

UNITED STATES PATENTS

| | | |
|---|---|---|
| 998,623 | Lundgren | July 25, 1911 |
| 1,642,009 | Bessler | Sept. 13, 1927 |
| 1,652,091 | Christian | Dec. 6, 1927 |
| 1,761,556 | Arnold | June 3, 1930 |
| 2,616,623 | Goodbar | Nov. 4, 1952 |
| 2,683,413 | Muller | July 13, 1953 |